Oct. 21, 1969 W. STAHL 3,473,706

AUTOMATIC PRE-PLEATING DEVICE

Filed Oct. 19, 1967 16 Sheets-Sheet 1

INVENTOR
Wolfgang Stahl.
BY
HIS ATTORNEYS

Oct. 21, 1969 W. STAHL 3,473,706

AUTOMATIC PRE-PLEATING DEVICE

Filed Oct. 19, 1967 16 Sheets-Sheet 2

INVENTOR
Wolfgang Stahl.
BY
Burgess, Dinklage & Sprung
HIS ATTORNEYS

Oct. 21, 1969 W. STAHL 3,473,706

AUTOMATIC PRE-PLEATING DEVICE

Filed Oct. 19, 1967 16 Sheets-Sheet 3

INVENTOR
Wolfgang Stahl.
BY
Buell, Blenko & Ziesenheim
HIS ATTORNEYS

Oct. 21, 1969 W. STAHL 3,473,706

AUTOMATIC PRE-PLEATING DEVICE

Filed Oct. 19, 1967 16 Sheets-Sheet 4

INVENTOR
Wolfgang Stahl.
BY
Buell, Blenko & Ziesenheim
HIS ATTORNEY

Oct. 21, 1969 W. STAHL 3,473,706

AUTOMATIC PRE-PLEATING DEVICE

Filed Oct. 19, 1967 16 Sheets-Sheet 5

INVENTOR
Wolfgang Stahl.
BY
Buell, Blenko & Ziesenheim
HIS ATTORNEYS

INVENTOR
Wolfgang Stahl.
BY
Buell, Blenko & Ziesenheim
HIS ATTORNEYS

INVENTOR
Wolfgang Stahl.
BY
[signature]
HIS ATTORNEYS

AUTOMATIC PRE-PLEATING DEVICE

Filed Oct. 19, 1967

INVENTOR
Wolfgang Stahl
BY
Burl, Blenko & Ziesenheim
HIS ATTORNEYS

INVENTOR
Wolfgang Stahl.
BY
[signature]
HIS ATTORNEYS

INVENTOR
Wolfgang Stahl.
BY
HIS ATTORNEY

Oct. 21, 1969 W. STAHL 3,473,706

AUTOMATIC PRE-PLEATING DEVICE

Filed Oct. 19, 1967 16 Sheets-Sheet 11

INVENTOR
Wolfgang Stahl
BY
[signature]
HIS ATTORNEYS

AUTOMATIC PRE-PLEATING DEVICE

Filed Oct. 19, 1967

AUTOMATIC PRE-PLEATING DEVICE

Filed Oct. 19, 1967 16 Sheets-Sheet 14

INVENTOR
Wolfgang Stahl.
BY
Buell, Blenko & Ziesenheim
HIS ATTORNEYS

AUTOMATIC PRE-PLEATING DEVICE

Filed Oct. 19, 1967

INVENTOR
Wolfgang Stahl
BY
Lindl, Plante & Ziesenheim
HIS ATTORNEYS

United States Patent Office 3,473,706
Patented Oct. 21, 1969

3,473,706

AUTOMATIC PRE-PLEATING DEVICE

Wolfgang Stahl, Monroeville, Pa., assignor to Sewtronic Development Corporation, Pittsburgh, Pa., a corporation of Pennsylvania Filed Oct. 19, 1967, Ser. No. 676,488
Int. Cl. D06j 1/00
U.S. Cl. 223—31 25 Claims

ABSTRACT OF THE DISCLOSURE

An automatic and quickly pre-programmed pleating machine is disclosed for pre-pleating the buckram strip normally sewn into drapery panels to stiffen the pleats thereof.

In making draperies and other decorative hangings, a strip of buckram or other stiffffened material is normally sewn into the drapery panels or the like to stiffen the pinch-pleats thereof. A pinch-pleated drapery usually comprises spaced apart groups or clusters of three knife pleats, and the depth of the pleats, spacing between the pleats and number of pleats determines the finished width of a panel after the pleats are sewn into permanent position. It will be apparent of course, that the number of knife-pleats comprising a cluster or group may be varied. My machine can be pre-programmed with a matter of seconds to automatically set the pleat depth, distance from pleat cluster to pleat cluster, number of pleats, the lengths of the margins or returns from-pleat to edge on either side of a drapery panel, and the number of buckram strips required. Buckram strips or the like can be pre-pleated on the same roll of material in either identical or different sizes and individually separated. The overall pleating machine and its electro-mechanical actuating circuit is novel, while several components thereof, including adjustable pleat depth mechanism and an adjustable pleat sensing and locating mechanism are novel per se.

The present invention relates to an automatic pre-pleating device suitable for various types of material requiring subsequent pleating, but more particularly for pre-pleating the buckram reinforcing strips utilized in the manufacture of pleated draperies and the like. Specifically, my novel pre-pleating device can be pre-programmed to accommodate the large number of variables encountered in fabricating custom or made-to-order type of drapery or the like to fit any window width, and to permit a considerable increase in the present, very limited variety of commercial or off-the-shelf panel sizes of draperies and other decorative hangings.

The buckram used in fabricating draperies is conventionally available in various materials. In many applications, the buckram is formed from a stiff, cellulosic base which is reinforced by artificial fibers. Other frequently used buckrams are made of woven cotton cloth, which is either reinforced with starch or chemically treated. All buckram types are offered in many grades.

As described in detail hereinafter, my pre-pleating machine can be adapted for use in pre-pleating buckram to facilitate the pleating of any type of drapery or other decorative hanging. It is applicable especially to home-sized decorative hangings such as window curtains, draperies and valances, as well as to large commercial draperies. More significantly, however, my pre-pleating machine not only can be pre-programmed to pleat either difficult to process custom-made draperies, or the limited number of standard sizes now provided by mass-producers of off-the-shelf draperies, but my invention also makes possible the epansion in the number of standard sizes available to these large-scale manufacturers.

Mass produced draperies, which are sold to the consumer in retail stores, are available only in a comparatively few standardized pleated widths, although there are almost infinite variations in window widths. Therefore, it is very difficult to obtain a ready-made drapery that is pleated to fit the average window. Up to the present time, no one machine, so far as I know, has been devised which can form a cluster of pleats in any depth, space them apart in any width in accordance with the requirements of the window measurements, and also be capable of producing standardized sizes economically in quantities usually demanded by mass-production manufacturers.

None of the machines that are currently available is capable of automatically pre-setting and counting the number of pleats in a given panel, nor automatically pre-setting and counting the number of panels in a given production run.

For example, Sherman Patent No. 2,595,459 discloses a pre-pleating machine for producing a large volume of drapery panels in standard size pleat depth and pleat spacing. The buckram strip is passed between a pair of rotating heads having creasing blades and grooves respectively for creasing or preforming the pleats. A different set of rotating heads, mounted on an individual stand with separate drive mechanism is necessary for each pleated size. The reason for the limitation in the number of standardized sizes is thus readily apparent.

Another type of machine is disclosed in Petzal et al., Patent No. 2,708,059 which utilizes a flat bed device with heating elements and five sets of male and female dies to impress five pleat clusters simultaneously. This operation is preformed after the buckram has been sewn into the drapery fabric. To change the dies in order to vary the cluster to cluster spacing, or to obtain more or less pleat depth is obviously a time consuming operation.

In general, conventional pre-pleating machines require at least the changing of male and female dies for every change in pleat depth and pleat-to-pleat distance. As variations in these characteristic dimensions are almost limitless, only a very small number of standard sizes can be handled by previous pre-pleating machines.

In addition to the aforementioned pre-pleating machines, there are other devices which are exclusively used in making custom-made draperies but which cannot eliminate the many manual operations customarily employed.

One such device requires the use of a chart, after the buckram is already sewn into the drapery fabric, to determine the space to be consumed by the pleats, the space between the pleats for a given panel size and number of pleats. Then the panel is transported to a sewing machine, which has calibrations on its base, whereby the positions of various operating levers are established in conformance with the aforementioned shart information. This process is not only very slow, but only longitudinal stitching can be made on this machine, after which the panel must be transferred to another operator who manually forms the pleat creases and stitches each group of pleats thus formed into permanent position.

Still another, largely manual, method of making custom draperies employs a mechanically and electrically operated measuring device. The buckram is first sewn into the drapery panel. Next the buckram portion of the panel is fastened to the measuring device with a series of clamps, and then the panel is constricted to the proper pleated width by the formation of a series of folds. Each of these folds, however, must be fastened with a staple before the drapery is removed from the measuring device to prevent disarrangement. Then the panel is transported to a sewing machine for longitudinal stitching of the pleat folds and subsequently to another machine where creases to form the triple clusters are made by hand and sewn together.

With my novel pre-pleating machine, the buckram can be pre-pleated even for a custom-made drapery before stitching into the panel, and much less skill is therefore required to complete the sewing of the pleats. The drapery fabric follows the contours of the creases imparted to the buckram, which the operator can easily locate by feel, thereby attaining maximum speed in forming perfect pleat clusters. These can be completely stitched together on an applicable industrial sewing machine without the necessity of transference to any other machine or to another operator.

My novel machine is capable of quick and facile adjustment of its pre-punching and pre-pleating mechanisms and of its counting mechanisms to (1) change the depth of the pleat folds, (2) vary the pleat center to center distances, (3) independently adjust the length of the right hand panel return, (4) independently adjust the length of the left hand panel return, (5) preset and count a predetermined number of pleats between the left hand and right hand returns, (6) preset and measure the length of the buckram strips required for the individual panels, and (7) preset and count a predetermined number of buckram strips for the panels required. It should be emphasized that no manual measuring is needed, and that the length of the right hand return can be varied independently of that of the left hand return and vice versa. It will be readily apparent that with a pre-pleating machine capable of being pre-programmed to account for all of the aforementioned variables involved in the location, size and number of drapery pleats and the like, and with the pre-programming requiring at most a few seconds of time, that it is commercially feasible to pre-pleat buckram strips for custom-made draperies and the like or for other very limited production runs, as well as for present-day quantities of mass-produced or standard drapery sizes. It is, of course, well known in the art that considerable expense and hand labor is saved by the use of pre-pleated buckram. As mentioned above, the use of pre-pleated buckram is at present only feasible in connection with mass-produced drapery panels and the like in a very few standard sizes. With my novel pre-pleating machine it is commercially feasible to pre-pleat buckram when only one or two panels of a given size are to be custom-made. Thus, the labor in fabricating custom-made draperies or other hangings now can be substantially reduced.

I accomplish these desirable results by providing a pre-pleating machine comprising means for supporting and transporting a strip of relatively stiff, foldable material along a path through said machine, means mounted on said machine along said path for punching and creasing said strip, pleating means mounted adjacent said punching and creasing means for creasing said strip, said pleating means being movable toward and away from said punching and creasing means in the path of travel of said strip to adjust the depth of folds imparted to said strip.

I also desirably provide a pre-pleating machine wherein means are provided for laterally adjusting each of said pleating means so that the distance between said punching and creasing means and respectively adjacent ones of said pleating means remain equal irrespective of the adjusted position of said pleating means.

I also desirably provide a pre-pleating machine wherein electro-mechanical adjustment means are mounted on said machine at a position along said path adjacent said pleating means, said electro-mechanical means including sensor means movable toward and away from said punching and creasing means along said path and co-operable with holes punched in said strip by said punching and creasing means, said electro-mechanical means including an actuating circuit, coupled to said sensor means and to actuating means for said punching and creasing means for determining the location of succeeding punches and pleats imparted to said strip by said punching and creasing means.

I also desirably provide a pre-pleating machine wherein said electro-mechanical means includes pre-settable counter means for successively energizing said punching and creasing means and said pleating means and for terminating the action of said punching and creasing means and said pleating means after a predetermined number of pleat folds have been produced in said strip to determine the number of said folds in a given panel strip.

I also desirably provide a pre-pleating machine wherein said electro-mechanical means in addition includes pre-settable panel counting means for repeating the sequential actions of said machine until a given pre-set number of said panel strips is produced by said machine.

I also desirably provide in measuring and locating means for use with pre-pleating apparatus and the like, the combination comprising an elongated housing, means in said housing for defining a strip therethrough and longitudinally thereof, at least one sensor movably mounted on said housing for movement along said strip path, said sensor having a light source and a juxtaposed photodiode mounted thereon, said light source co-operating with identification holes in said strip to produce out-put control signals in said photodiodes in response to the adjusted position of said sensor.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
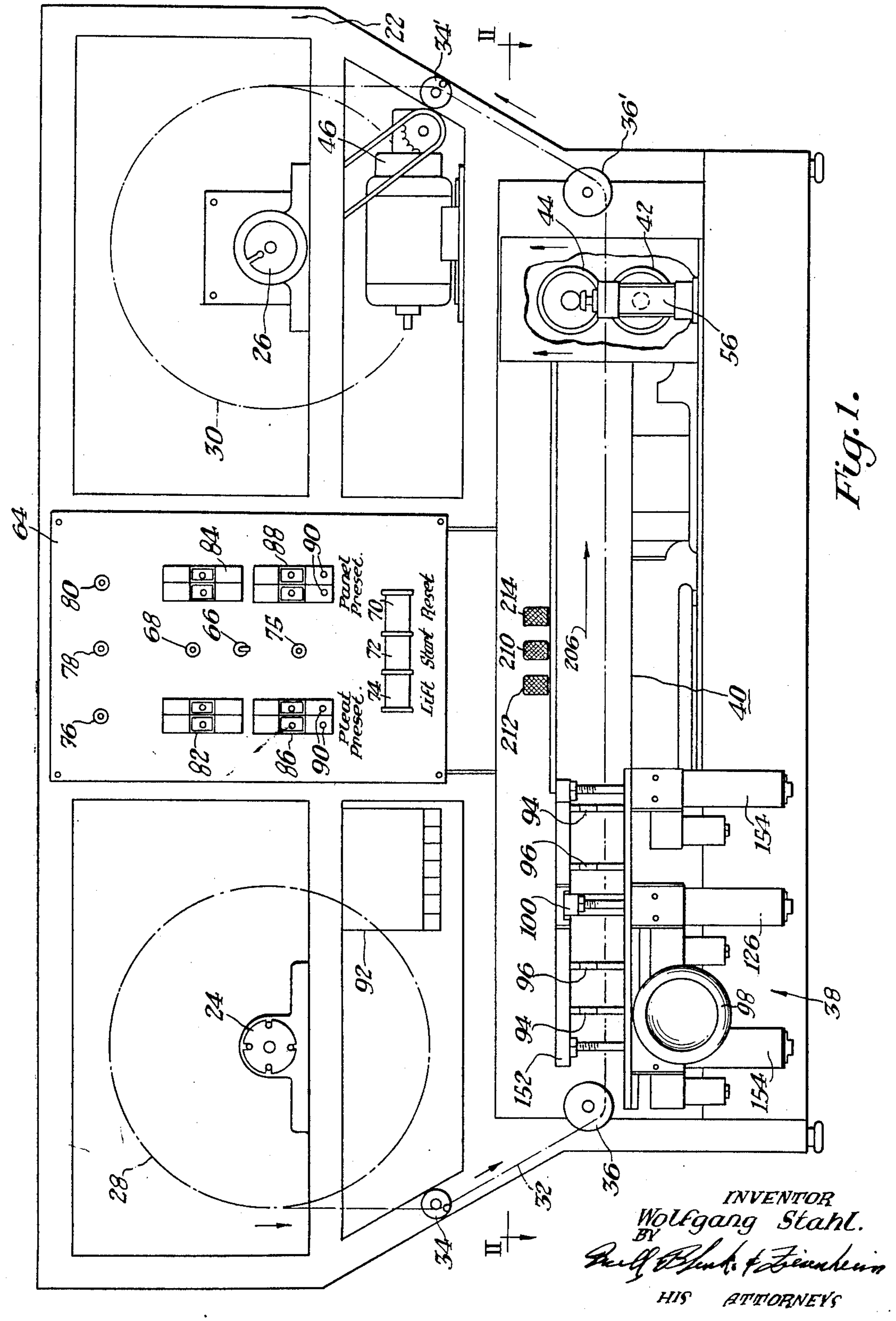
FIGURE 1 is a front elevational view of one arrangement of my novel pre-pleating or pre-folding machine arranged in accordance with the teachings of my invention.
Figure 2:
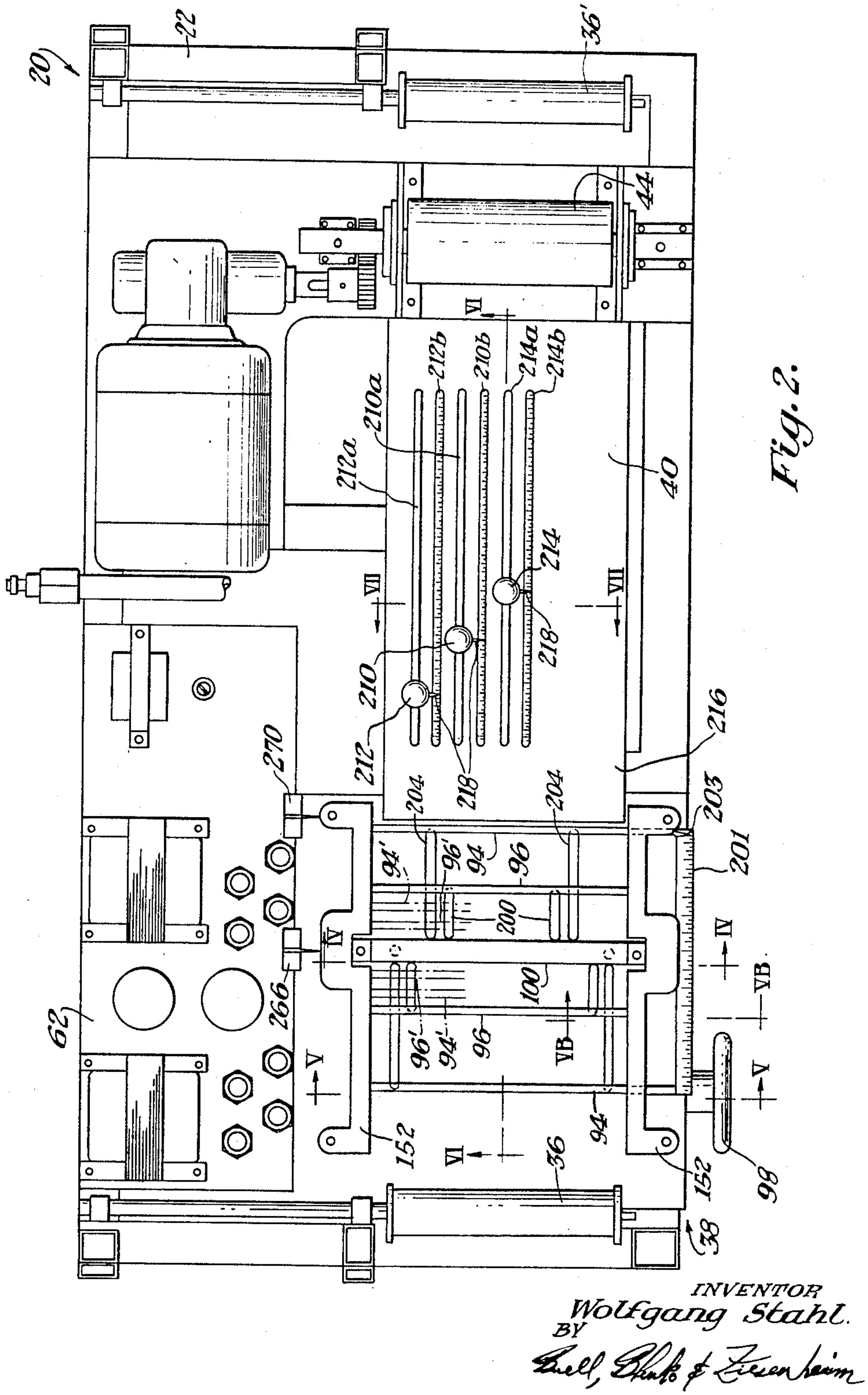
FIGURE 2 is a horizontally sectioned view of the apparatus shown in FIGURE 1 and taken along reference line II—II thereof.
Figure 3:
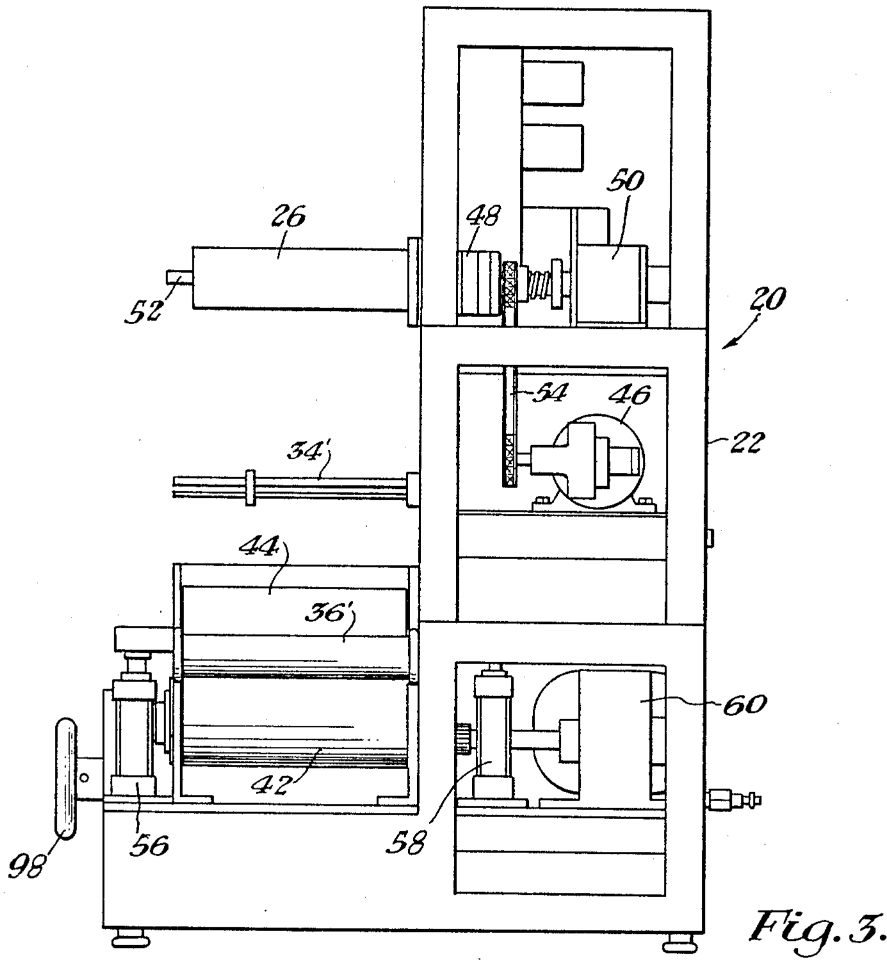
FIGURE 3 is a right side elevational view of the apparatus as shown in FIGURE 1.

Referring now more particularly to FIGURES 1 through 7 of the drawings and initially to FIGURES 1 through 3 thereof, the exemplary form of my automatic pre-folding or pre-pleating machine 20 shown therein comprises a supporting framework 22 on which pay-off buckram spindle 24 and take-up buckram spindle 26 are rotatably mounted, with the substantially fully wound quantities of buckram thereof being denoted by chain outlines 28 and 30 respectively. The path of buckram strip, denoted by chain outline 32 thereof, passes from the pay-off spindle 24 around guide 34 and idler spindle 36 through variable creasing and punching device 38 through variable pleat locating device 40, between pinch and drive rollers 44, 42, around idler spindle 36', guide 34', and on to take-up spindle 26 driven by motor and gear unit 46 as better shown in FIGURE 1. The motion of the take-up spindle 26 is controlled through slip clutch 48 and magnetic brake 50 which are coupled as better shown in FIGURE 3 to take-up spindle shaft 52 which in turn is connected through chain drive 54 or other suitable transmission to the motor and gear unit 46.

The upper pinch roller 44 is raised and lowered as better shown in FIGURE 3 in this example by a pair of cylinders 56 and 58 mounted on the framework 22. The action of the cylinders 56, 58 is controlled, by means presently to be described, to clamp and release the buckram 32 between the vertically movable upper pinch roll 44 and the lower pinch roll 42, which is rotated by drive motor and gear unit 60. The aforementioned slip clutch 48 and magnetic brake 50 prevents pulling of the buckram strip 32 by the rewind spindle 26 and the rewind drive 46 when the pinch drive rolls 42, 44 are separated.

As better shown in FIGURE 2 a power supply 62 of a more or less conventional nature is mounted upon the framework 22 for supplying proper voltages to the various electrical components as described hereinafter in connection with FIGURES 8 and 9 of the drawings. As better shown in FIGURE 1 a control panel 64 is mounted centrally upon the upper portion of the framework 22 and includes various operating switches and controls such as power switch 66 with on-off indicator lamp 68, continuation of program switch 75 and reset, start, and pinch roll lift switches 70, 72 and 74 respectively. Additional indicator lamps 76, 78 and 80 are mounted on the control panel 64 for indicating "ready start," "end of program," and "malfunction." The lamps 76 to 80 may be of differing colors to facilitate observation. A pleat counter 82 and a panel counter 84 likewise are mounted on the control panel 64 together with pleat pre-set and panel pre-set counters 86, 88 therefor. The pre-set counters are provided with a pair of indexing operators 90 in the conventional manner. The interconnection and operation of the various electro-mechanical components and other electrical components of my novel pre-pleating machine 20 are likewise described in greater detail in connection with FIGURES 8 and 9 of the drawings.

A drapery fabricator chart 92 can be installed, if desired, on the framework 22 from which the required pleat depth, number, spacing and location can be quickly derived, together with the length of left and right end returns for a given size of drapery panel. With this information my pre-pleating machine 20 is quickly and easily programmed without any of the usual time-consuming measuring or cutting of the buckham strip 32.

Briefly, the pleat depth, as determined by the total length of the buckram strip 32 which an individual pleat will supply, is determined by pairs of movable scoring or perforating bars forming part of the pleating means 94, 96 for creasing the strip 32. The pleating means 94, 96 can be accurately spaced between the solid outline positions thereof in FIGURE 2 and their chain outline positions 94', 96' by unique adjustment mechanism forming part of the variable pleat depth and punching device 38 and described below in greater detail in connection with FIGURES 4 to 6 and related figures of the drawing. The pleat depth device 38 is controlled by handwheel 98 to provide an adjustment extending from a maximum pleat depth such as that shown in FIGURE 2A of the drawings to a minimum pleat depth such as that shown in FIGURE 2B.

As used herein, the term "creasing" shall be deemed to include scoring and/or perforating along a fold line and equivalents thereof.

Figure 5B:
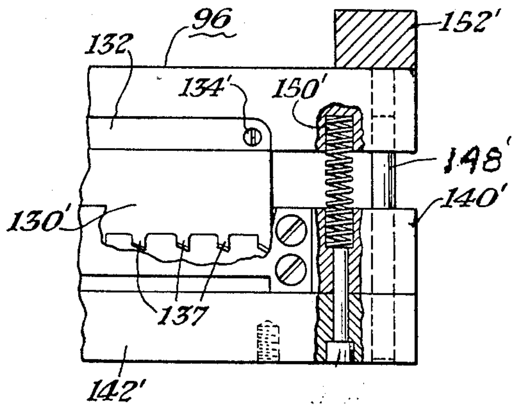
FIGURE 5B is another enlarged partial, cross-sectional view of the apparatus as shown in FIGURE 2 and taken along reference line VB—VB thereof.
Figures 4, 4A, 4B:
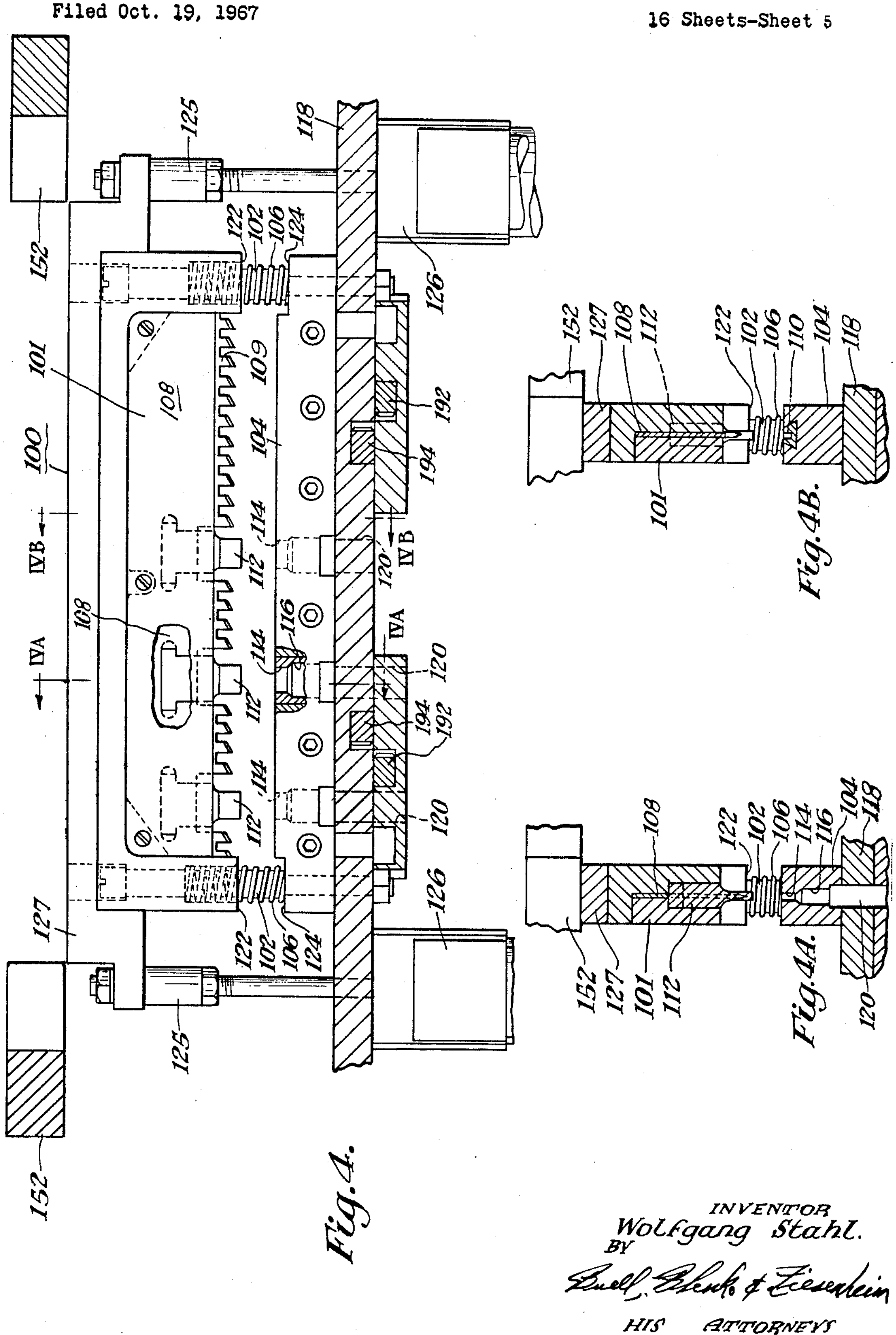
FIGURE 4 is an enlarged, partial, cross-sectional view of the apparatus as shown in FIGURE 2 and taken along reference line IV—IV thereof.
FIGURE 4A is a cross-sectional view of the apparatus as shown in FIGURE 4 and taken along reference line IVA—IVA thereof.
FIGURE 4B is a similar view but taken along reference line IVB—IVB of FIGURE 4.
Figure 5A:
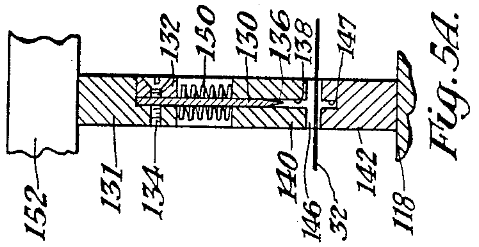
FIGURE 5A is a partial cross-sectional view of the apparatus as shown in FIGURE 5 and taken along reference line VA—VA thereof.
Figure 5:
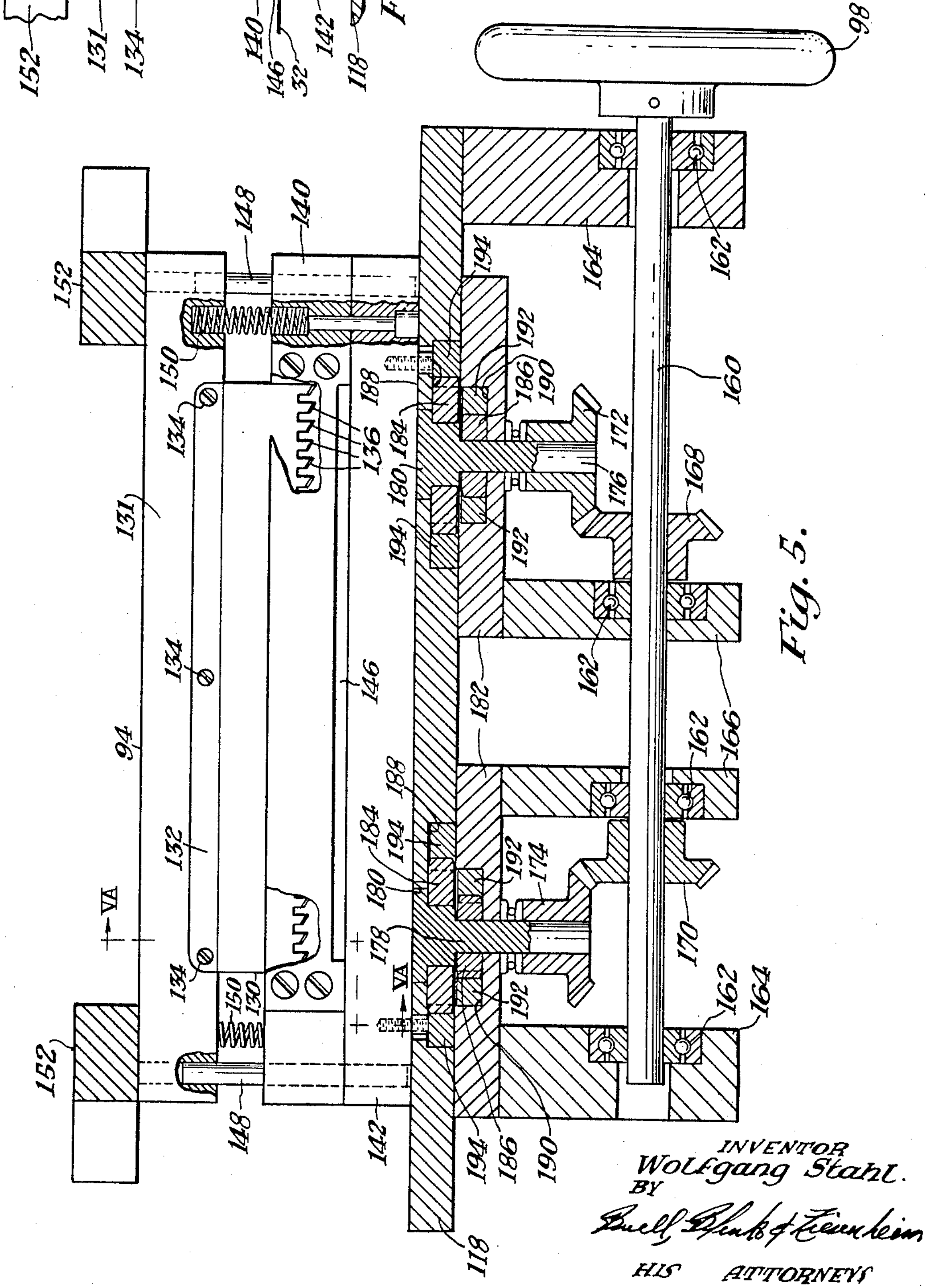
FIGURE 5 is another enlarged cross-sectional view of the apparatus as shown in FIGURE 2 but taken along reference line V—V thereof.
Figures 6, 6A, 6B:
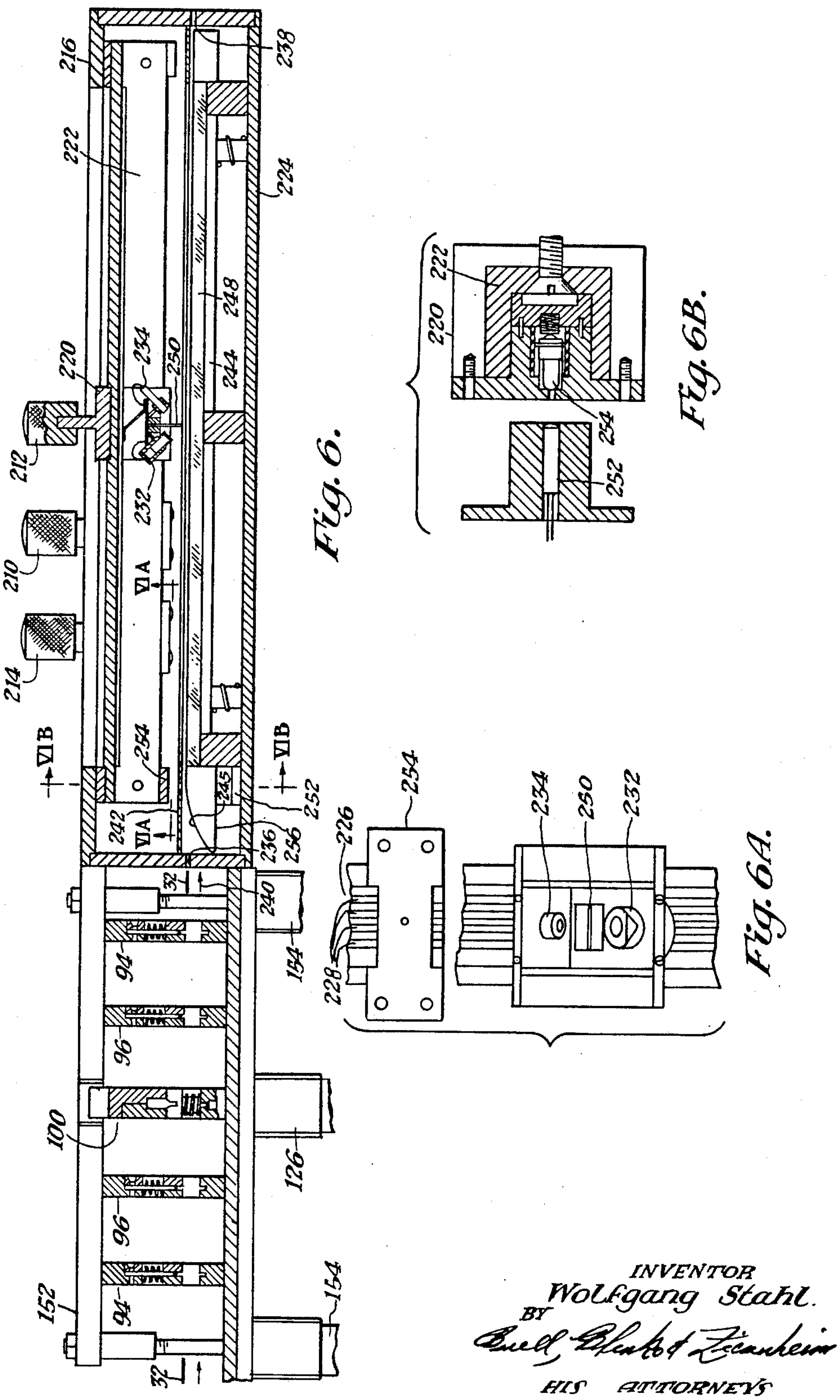
FIGURE 6 is an enlarged partial longitudinally sectioned view of the apparatus as shown in FIGURE 2 and taken along reference line VI—VI thereof.
FIGURE 6A is a partial longitudinally sectioned view of the apparatus as shown in FIGURE 6 and taken along reference line VIA—VIA thereof.
FIGURE 6B is a cross-sectional view of the apparatus as shown in FIGURE 6 and taken along reference line VIB—VIB thereof.

The mechanism for moving the pleating means 94, 96 between their maximum and minium positions is shown in greater detail in FIGURES 4, 5 and 6.

Figures 2A, 2B:
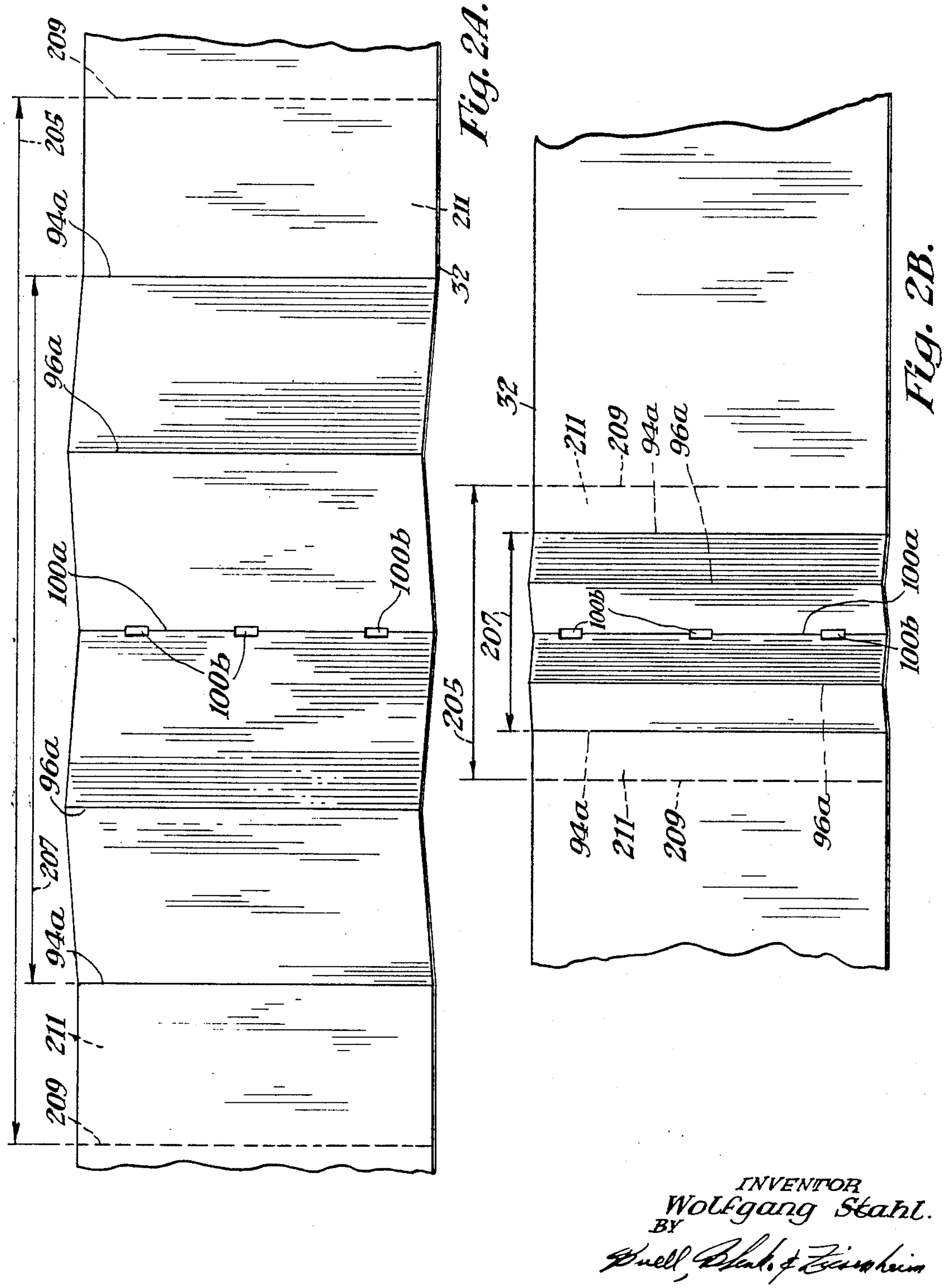
FIGURES 2A and 2B are enlarged top perspective views of portions of buckram material pre-pleated by my machine and illustrating maximum and minimum pleat depth, respectively.

As shown in FIGURES 2 and 4 stationary punching and creasing means 100 are mounted between the inner pleating means 94, 96 for the purpose of making the central fold crease 100*a* (FIGURES 2A and 2B). The punching and creasing means 100 includes a central and movable bar 101 which also punches a series of identification openings 100*b* in the buckram strip 32, the purpose of which openings are described hereinafter. FIGURES 4 and 4A show that the central bar 101 is movably mounted on a pair of vertical and stationary shafts 102 for spring-loaded movement toward and away from die bar 104. The movable bar 101 and the die bar 104 are biased apart by means of coil springs 106.

In this arrangement the central bar 101 includes a relatively thin blade 108, or the like, with serrations or teeth 109, which perforate the buckram strip 32 along the central fold or crease line 100*a* (FIGURES 2A and 2B). As better shown in FIGURE 6C the blade 108 penetrates the buckram strip 32 and extend to groove 110 in the die bar 104 at the lowered position of the central bar 101.

As better shown in FIGURES 4 and 4A the punch bar 101 also includes a plurality of slotted punches 112 which are spacedly mounted therealong. When the central bar 101 is lowered the lower end portions of the punches 112 penetrate through the buckram strip 32 and enter die cavity inserts 114 in the die bar 104. The lower portions 116 of the die cavities desirably are expanded to facilitate removal of the punched pieces of buckram. The stationary die bar 104 is rigidly mounted on the shafts 102 and contacts platform 118 supported by the framework 22. The platform 118 includes apertures 120 which are aligned with the die cavities 114 through which the punched pieces of buckram fall into a suitable collection bin (not shown) or the like.

The central bar 101 is forced downward against the action of the biasing springs 106 until stop surfaces 122 on the bar 101 engage stop surfaces 124 on the die bar 104. Such movement is effected by a pair of cylinders 126 (FIGURES 1 and 4), acting through rods 125 and yoke 127. The action of the cylinders 126 is controlled as described hereinafter in connection with FIGURES 8 and 9.

The structure of the outer pleating means 94 is shown in FIGURES 5, 5B and 6 of the drawings. The pleating means 94 include a relatively thin blade 130 sectioned to vertically movable creasing bar 131 by clamp strip 132 and mounting screws 134. The blade 130 as better shown in FIGURE 5 is provided with a serrated edge or teeth 136 or equivalent along its lower edge, and the lower portion of the blade 130 is movable vertically through slot 138 of guide bar 140 which in turn is secured to die bar 142 by means of suitable mounting screws. The major proportion of the guide bar 140 is spaced from the die bar 142 to provide an elongated slot 146 for passage of the buckram strip 32 therethrough.

The crease bar 131 is slidably mounted on a pair of stub shafts 148 which are rigidly secured in this example to the ends of the guide bar 140. The crease bar 131 on the one hand and the guide bar 140 and die bar 142 on the other are biased apart by a pair of coil springs 150 having their ends inserted in suitable recesses in the crease bar 131 and guide bar 140. The die bar 142 is provided with a longitudinally extending groove 147 to receive the serrations 136 after they penetrate the buckram strip 32.

The ends of the crease bars 131, and in a similar manner the ends of the vertically movable die bars 156, forming part of the pleating means 96 and described below, underlie a pair of spaced yoke members 152. The yoke members 152 as better shown in FIGURES 1 and 2 are of sufficient length that they overly the ends of the pleating means 94, 96 irrespective of the adjusted position of the laterally movable pleating means 94, 96. Thus, the vertically movable components of the pleating means 94, 96 are moved simultaneously downward by downward movement of the yoke member 152, which downward movement is effected in this example by two pairs of actuating cylinders 154 having their distal piston rod ends connected respectively to the ends of the yoke members 152. The action of the cylinders 154 is controlled as described hereinafter in connection with FIGURES 8 and 9 of the drawings.

The structure of the pleating means 96 is shown in particular in FIGURE 5B of the drawings where similar reference characters with primed accents denote similar parts of FIGURE 5. In general, the structure is similar to that of the pleating means 94 (FIGURE 5) with the exception that the blade 130 of the pleating means 96 is provided with serrations or teeth 137 which are farther apart than the teeth 136 of the pleating means 94. With this arrangement the outer perforated crease or score lines produced by the outer crease bars 131 will bend more easily than the inner perforated score lines **96*a*, produced by the inner crease bars 131. Thus, after the buckram strip is sewn into the drapery fabric, an operator is able to sense or feel the outer crease line 94*a*** to commence folding the pleat cluster at the proper crease line.

Figures 6C, 7:
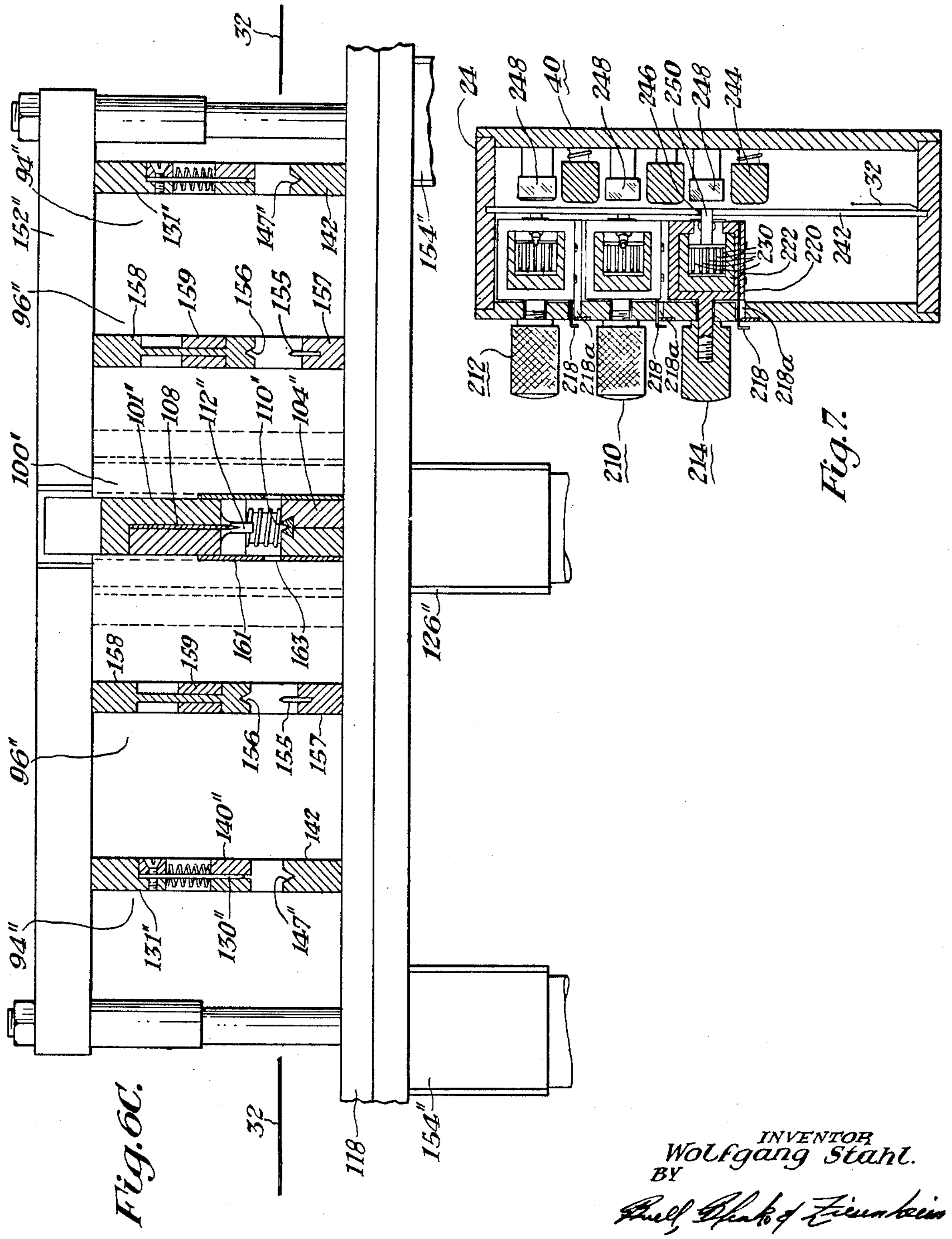
FIGURE 6C is a partial cross-sectional view similar to the upper left hand portion of FIGURE 6 but showing a modified arrangement of the punch and creasing means.
FIGURE 7 is another partial enlarged cross-sectional view of the apparatus as shown in FIGURE 2 and taken along the reference line VII—VII thereof.

An alternative arrangement for facilitating crease-sensing by the operator is shown in FIGURE 6C of the drawings, where similar reference characters with doubly primed accents denote similar components of the preceding figures. Blades 130″ of outer pleating means 94″, blade 108″ of punch and pleat means 100, and blades 155 of inner pleating means 96 are provided with continuous knife edges rather than serrations or teeth. These blades cooperate with V-grooves 147″, 110″ and 156 respectively. Blades 155 are supported on stationary blade holders 157 mounted beneath the strip 32 (as viewed in FIGURE 6C) and form part of the inner pleating means 96″. The cooperating V-grooves 156 are formed in crease bars 158 slidably mounted on slotted guide bars 159 for vertical movement toward and away from the knife blades 155.

With the arrangement of FIGURE 6C, when the yoke 152″ is depressed by cylinders 154″ the resulting crease and punch lines **94*a*, 96*a*, 100*a* have a zig-zag bias as shown in FIGURES 2A and 2B. This bias aids the operator in sensing the outer crease or fold 94*a***.

In the aforedescribed arrangement, the punch and crease means 100 and 100″ are provided with a stripper sheath 161 having an elongated opening 163 through which the buckram strip 32 is passed. The sheath 161 prevents the buckram from clinging to the punches and the knife blade 108″ when the yoke 152″ rises. The guide bars 140″ of the outer pleat means 94″ serve a similar purpose.

Referring now to FIGURES 4, 5, 6 and 5C there are disclosed means arranged in accordance with my invention for laterally adjusting the pleating means 94, 96 between their maximum and minimum pleat depth positions. Such means include an operating shaft 160 on which the previously mentioned handwheel 98 is mounted for rotation therewith. As better shown in FIGURE 5 operating shaft 160 is rotatably mounted on the under side of platform 118 by a plurality of bearing structures 162 mounted respectively in supports 164, 166. A pair of bevel gears 168 and 170 are affixed to the operating shaft 160 for rotation therewith and, through their close spacing from the supports 166 and their bearings 162, longitudinal play in the shaft 160 is substantially eliminated.

The operating shaft gears 168, 170, in this example are enmeshed with a second pair of bevel gears 172, 174 respectively affixed to a pair of stub shafts 176, 178. The stub shafts 176, 178 are rotatably supported by engagement of their headed portions 180 with platform 118 and by relatively close fitting but rotational engagement with a pair of retainer plates 182 mounted on the under side of platform 118.

Stub shafts 178, 176 are, therefore, rotated in respectively opposite directions, in this example, upon rotation of the operating shaft 160, by means of hand wheel 98. Each of the stub shafts 176 or 178 is provided with spur gears 184 and 186, with the larger spur gear 184 being twice the size of the smaller spur gear 186. As better shown in FIGURE 5 the upper, larger spur gears 184 are mounted for rotation respectively in a pair of recesses 188 formed in the under side of the platform 118 while the lower smaller spur gears 186 are mounted for rotation in recesses 190 of the retainer plates 182.

Slidably mounted in each of the retainer plate recesses 190 are a pair of inner racks 192, with each pair of the racks 192 being enmeshed with the associated spur gear 186. Similarly, a pair of outer racks 194 are slidably mounted in each of the platform recesses 188 where they are enmeshed with one of the larger spur gears 184. As better shown in FIGURE 5 turning of the handwheel 98 and resultant rotation of stub shafts 176, 178 and their spur gears 184, 186 by bevel gears 168–174 move the racks 192, 194 longitudinally of the platform 118 or in the direction of the laterally adjusted movements of the pleat bar assemblies 94, 96.

Figure 5C:
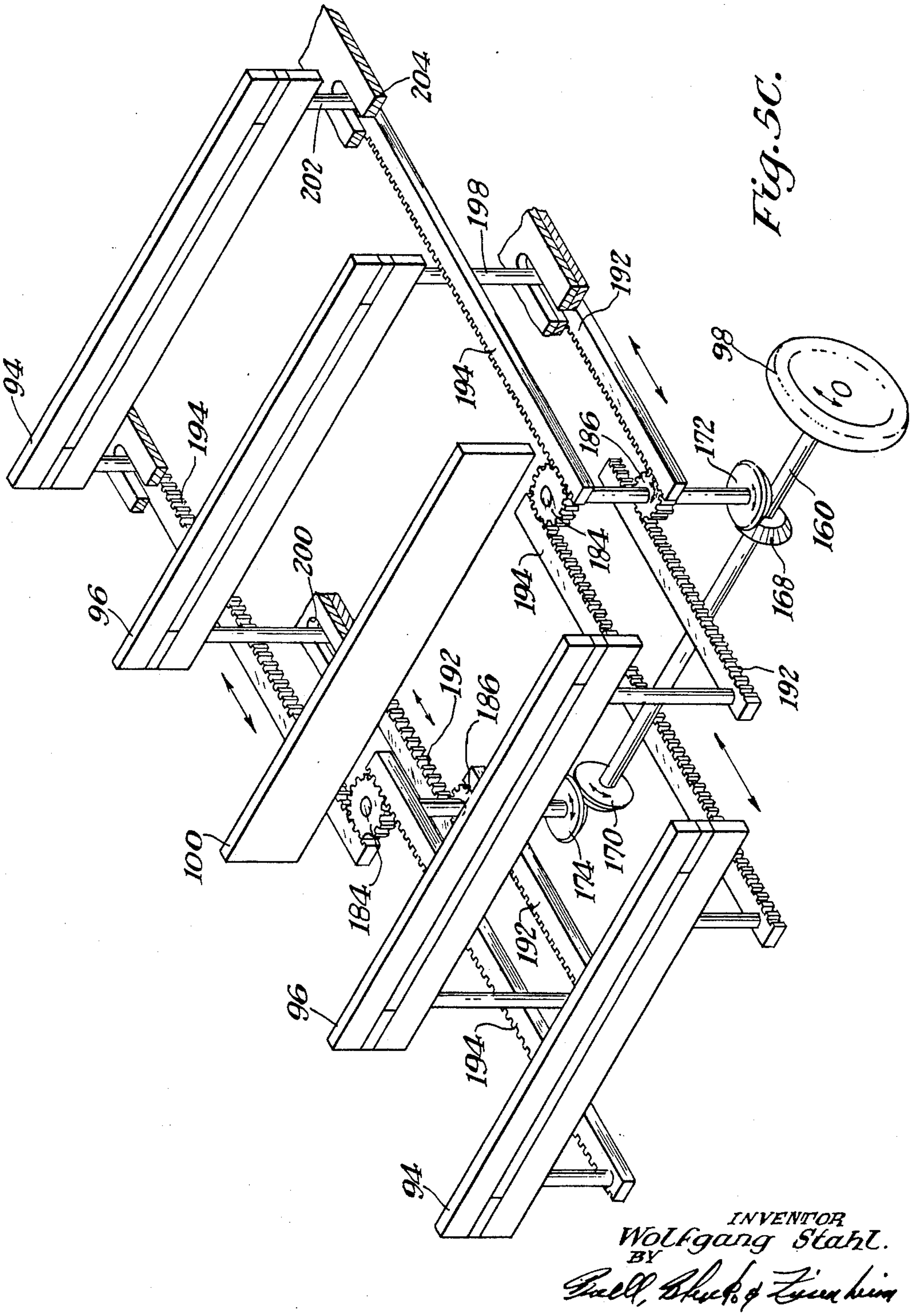
FIGURE 5C is a partial, mechanically schematic, isometric view of one arrangement for laterally adjusting the pleat means 94, 96 of FIGURE 2.

With this arrangement, as best shown in FIGURE 5C, the lower, shorter racks 192 are moved at a rate in this example equal to one-half that of the upper, longer racks 194. The ends of the shorter racks 192 are joined to the ends respectively of the inward pleating means 96 by means of bushings 198 projected vertically through slots 200 formed in both the platform 118 and the retainer plates 182. Similarly, the longer racks 194 are joined at their ends to the outer pleating means 94 by means of bushings 202 extended vertically through slots 204. Screws (not shown) are passed through the bushings 198 and 202 for securance to the associated pleating means 96, 94.

With this arrangement the outward pleating means 94 are moved laterally at twice the rate of travel of the inward pleating means 96 with each angular displacement of the handwheel 98. Accordingly as the pleating means 94, 96 are moved between their chain outline positions in FIGURE 2 and their solid outline positions, equal distances between adjacent crease lines **94*a*, 96*a*, 100*a* are preserved as evident from FIGURES 2A and 2B of the drawings. By the same token, the longitudinally extending slots 200 for the inward pleating means 96 need only be about one-half the length of that of slots 204 for the outer pleating means 96**.

As better shown in FIGURE 2 the punching and pleating device 38 is provided with a suitable calibrated scale 201 and indicator 203 secured respectively to the outer pleating means 94 for lateral movement therewith. Desirably, the scale 201 is calibrated to read the total pleat width 205 (FIGURES 2A and 2B) in inches or other suitable measuring units. Such calibration desirably takes into consideration the total stitched width of the pleat as denoted by dimensional arrows 205 in either FIGURE 2A or 2B rather than the distance denoted by dimensional arrow 207 between the outermost buckram crease lines 94*a*. Thus, the operator of the machine can use the calibrated scale to adjust the measuring and pleating device 38 to the width of the strip 32 to be occupied by each group of pinch-pleat creases. This omits the outer areas 211 added by stitching lines 209, made when the material is subsequently gathered and stitched. Accordingly, the operator does not have to calculate the strip dimension 207 in terms of the finished pleat dimensions 205.

After the pleating means 94, 96 and the punching and creasing means 100 have been actuated to punch and to pre-pleat the buckram strip 32, the latter resumes its path of travel in the direction denoted by arrow 206 (FIGURE 1). The strip 32 passes from the pleat and punch mechanism 38 of the pre-pleating machine 20 to the adjustable pleat locating and spacing device 40. As better shown in FIGURES 6, 6A, 6B and 7, the pleat locating device 40, after programming adjustment as described below, automatically determines the pleat center-to-center distances and the lengths of the left-and-right-hand returns of each drapery panel, by presetting the adjustable pick-ups 210, 212, 214, as described below. The end of a given panel and the beginning of a succeeding panel is readily identified by the absence of pleat folds other than that produced by the central punch and crease bar 101. Thus, it is not necessary to stop the machine 20 at the end of each drapery panel or to cut the buckram strip 32 at the end of each panel. Thus, a large number of pre-pleated buckram panel strips can be wound together upon the finished roll 30 of buckram. When the roll 30 is fully wound the buckram strips corresponding to individual drapery panels can be readily severed, by an operator, along the perforated punch and crease line 100*a* (FIGURES 2A and 2B), between the left hand return of one panel and the right hand return of a succeeding panel, irrespective of individual panel lengths. As explained below, the pleating means 94, 96 are not actuated at the end of a panel strip, so that only a punch and crease line 100*a* appears at the end of each panel strip.

In furtherance of these purposes the pleat locating device 40 includes in this example three adjustable pick-ups 210, 212, and 214 which are movable longitudinally of the locating device 40 by means of longitudinally slots 210*a*, 212*a*, and 214*a* in cover plate 216. Co-operating scales 210*b*, 212*b* and 214*b* are positioned beside the slots 210*a*–214*a* and substantially co-extend therewith to aid in the adjusting movement of the pickups 210–214, which are provided with pointed or other suitable indexing means 218 for this purpose. The scales 210*b*–214*b* are calibrated to read in inches or other suitable measuring units. The central scale 210*b* denotes the pleat center-to-center distances along the buckram strip. On the other hand, the outer scales 212*b* and 214*b* and the pickups 212, 214 associated therewith denote respectively the individual lengths of the left and right margins or returns of the drapery panel.

In this arrangement the pointers 218, as better shown in FIGURE 7, are secured to body portions 220 of the pickups 210–214 and are extended upwardly through relatively narrow slots 218*a* therefore along each adjacent edge of the scales 210*b*–214*b*.

As will now be explained, the pickups 210–214 co-operate respectively with the identification punches or holes 100*b* in performing their noted functions, as explained in detail below. Each of the pickups 210–214, as better shown in FIGURES 6 and 6A, is provided with a hollow body portion 220 whereby the pickup rides upon an elongated inverted channel member 222. Each of the channel members 222 (FIGURE 7) is disposed within housing 224 for the locating device 40 and directly below an associated one of the pickup slots 210*a*–214*a*. As better shown in FIGURE 6A each of the panels 222 is provided with a commutator strip 226 which in this example includes four conductive tracks 228 engageable by contact fingers 230 of the associated pickup. Each pickup further includes a light source 232 and photodiode 234, each of conventional construction. The light source and photodiode are energized by means of the commutator strip 226 and contact fingers 230 irrespective of the position to which the pickup is adjustably moved along the length of its slot.

As better shown in FIGURE 6 the buckram strip 32 enters through slot 236 in one end of the housing 224 and exits therefrom through slot 238 at the other end, in the direction denoted by arrow 240. During its passage through housing 224 the buckram strip is urged against the underside of partition plate 242 by means of a plurality of spring loaded pressure shoes 244. The entry ends of the pressure shoes are tapered at 245 (FIGURE 6) to facilitate threading the buckram strip 32 through the locating device housing 224 when each new roll 28 of buckram is loaded on the machine 20.

The partition plate 242 is likewise provided with pickup slots 246 disposed desirably in substantial alignment with the pickup slots in the cover plate 216 of the housing 224. A like number of elongated front-surfaced mirrors 248 are spaced below the partition plate 242 (FIGURE 7) so that the buckram strip 32 is passed between the partition plate 242 and the mirrors 248. Accordingly, when one of the identification openings 100*b* (FIGURES 2A and 2B) is juxtaposed to the light source 232 of the associated pickup 210, 212, or 214, a light pulse is transmitted from the light source 232 to the associated one of the mirror strips 248 and thence is reflected to the photodiode 234. The photodiode 234 as explained more fully hereinafter in turn translates an electrical pulse to the associated electrical components of FIGURES 8 and 9 to determine the related spacing function of the pickup 210, 212, or 214. As the buckram material is usually white, a light baffle 250 is interposed between the light source 232 and the photodiode of each pickup to multiply the light ratio of reflected light from the white buckram and the mirrors 248 so that the photodiode 234 can differentiate between the buckram surface and the mirror surfaces when the slots 246 are juxtaposed to the light baffles 250. In furtherance of this purpose the upper surface of the partition plate 242 desirably is painted black with a mat finish.

Desirably, the lower end of the light baffle 250 is projected (FIGURE 7) into the adjacent partition slot 246 to further discriminate between the buckram and the mirror surfaces.

As better shown in FIGURES 6 and 7 the light baffles 250 extend through the reflectional slots 246 in the housing partition 242 and terminate flushly with the bottom surface of the partition plate 242. The position of each light baffle 250 and its relatively close fitting insertion into the associated slot 246 (FIGURE 7) prevents little or no scattered light from reaching the photodiode 234. When one of the identification holes 100*b* from the light source 232 is juxtaposed to the lower end of the light baffle 250 light can then pass freely through the hole 100*b* to the associated mirror 248 and reflected back through the hole to the photodiode 234. The buckram strip 32 is pressed against the underside of the partition plate 242 to ensure that the identification holes 100*b* are properly sensed in the aforedescribed manner.

The locating device 40 is provided with a stationary pickup including photodiode 252 and light source 254 disposed adjacent the entry end of the housing 224. As better shown in FIGURE 6B, the stationary pickup 252–254 co-operates in this example with the central one of the identification holes 100*b* when juxtaposed to opening 256 therefor in partition plate 242 between the stationary diode 252 and stationary light source 254. As described presently in connection with FIGURES 8 and 9 the stationary pickup 252–254 transmits an electrical pulse to the operating circuit of the machine 20 to energize the movable pickups 210–214.

Figure 8:
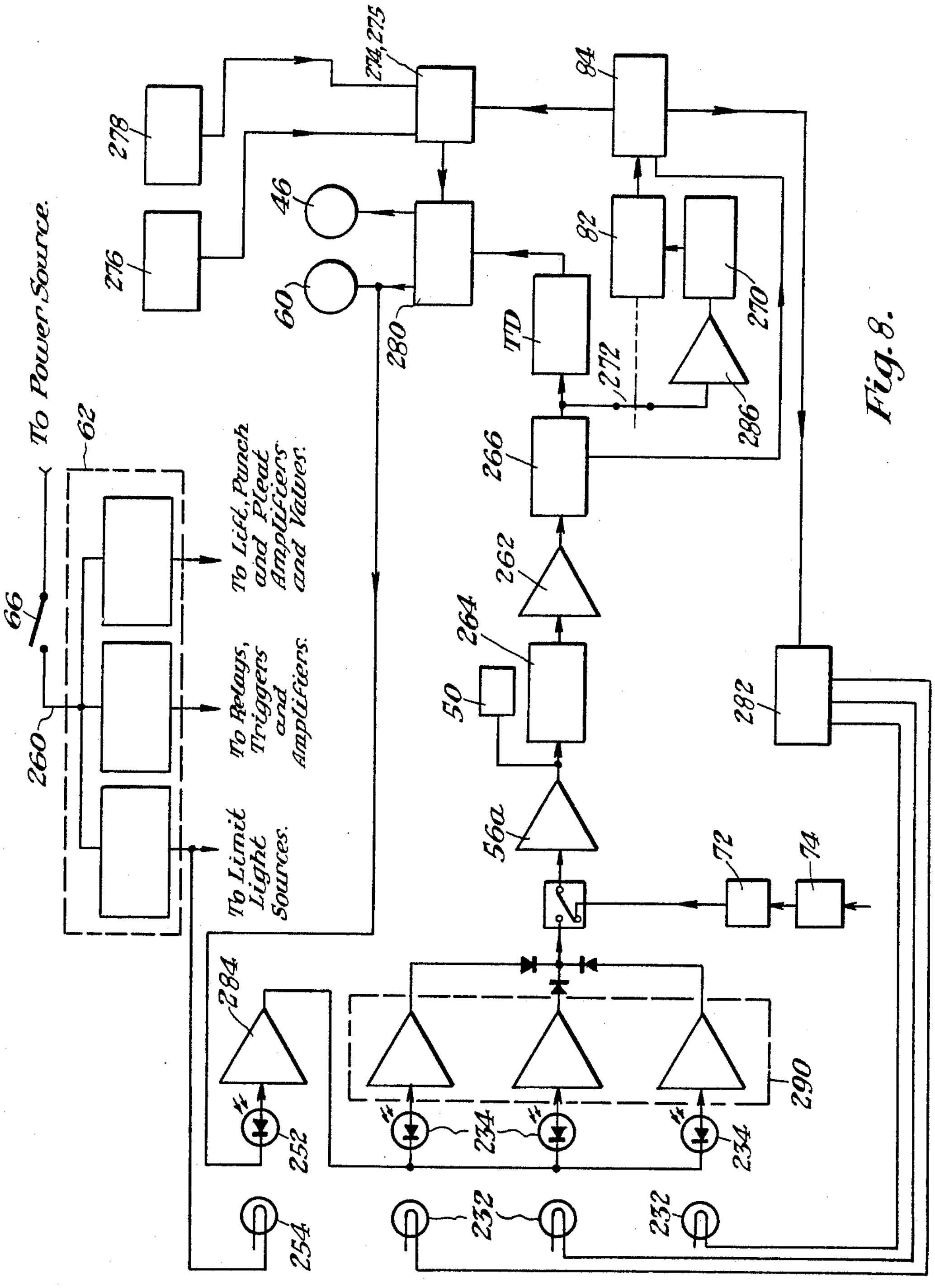
FIGURE 8 is a block circuit diagram of one form of control circuit useful in operating my pre-pleating machine shown in the preceding figures.
Figure 9A:
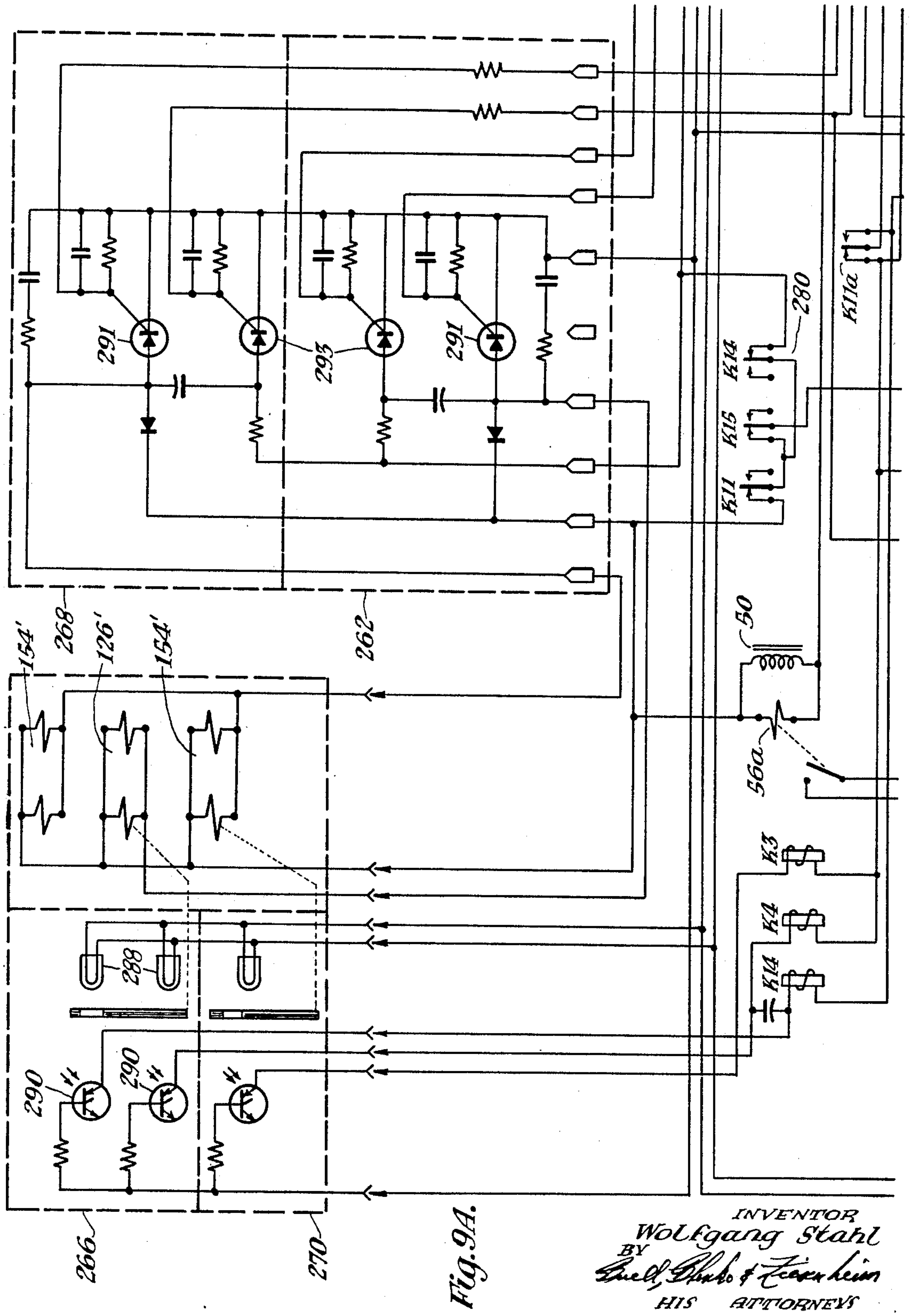
FIGURES 9A, 9B, 9C, 9D, 9E, and 9F are partial schematic circuit diagrams which together illustrate circuit details of the circuit components of FIGURE 8.
Figure 9B:
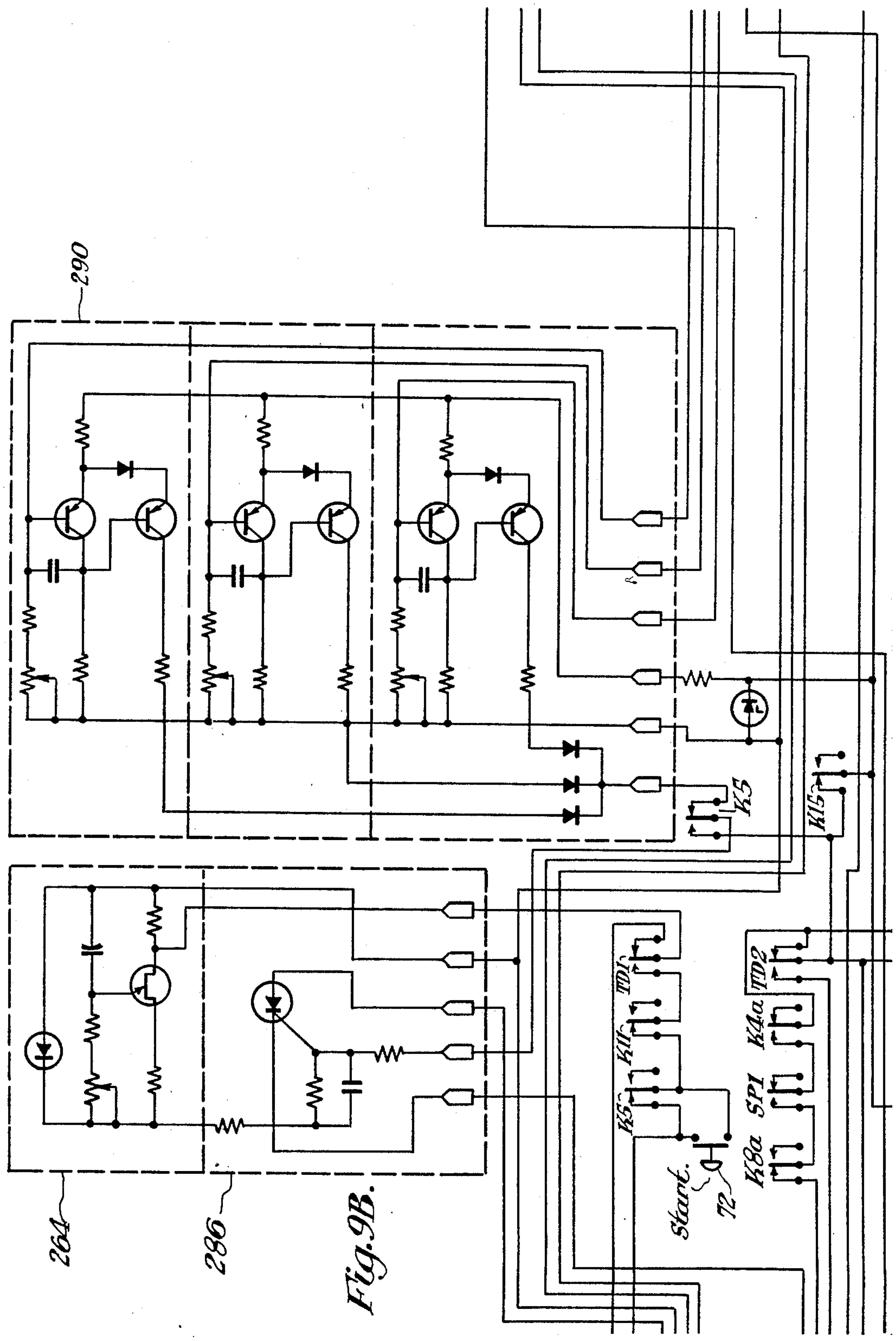
Figure 9C:
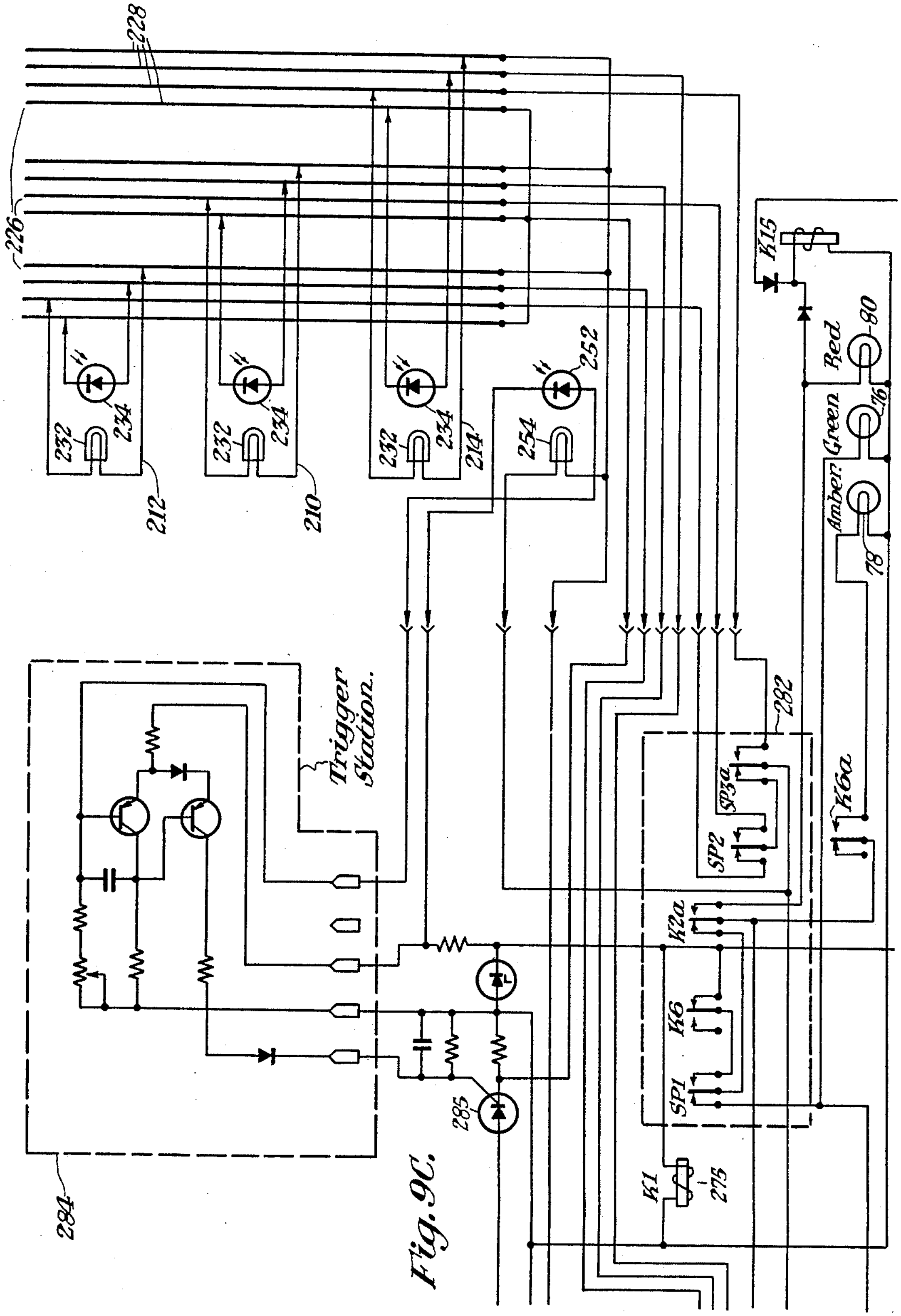
Figure 9D:
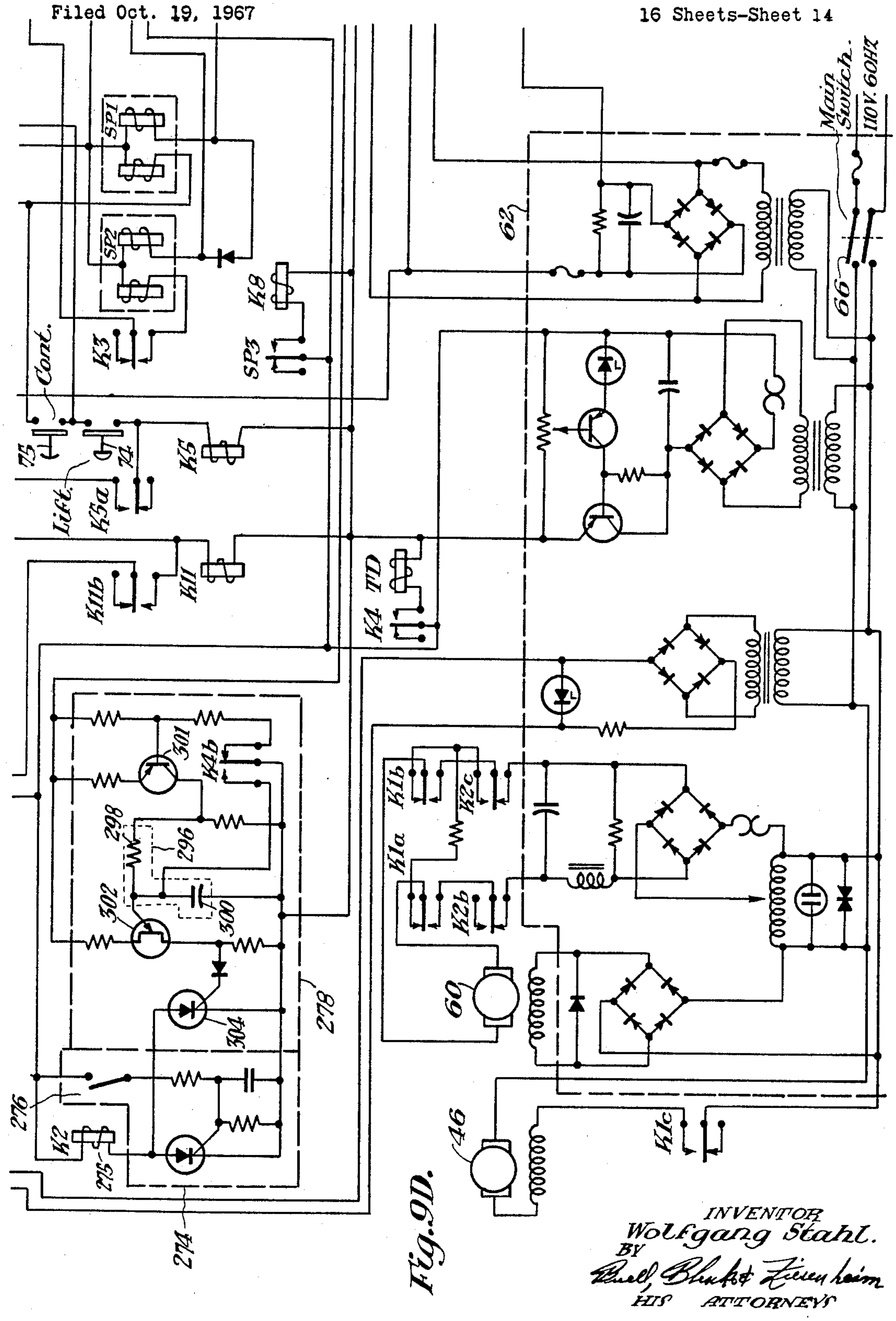
Figure 9E:
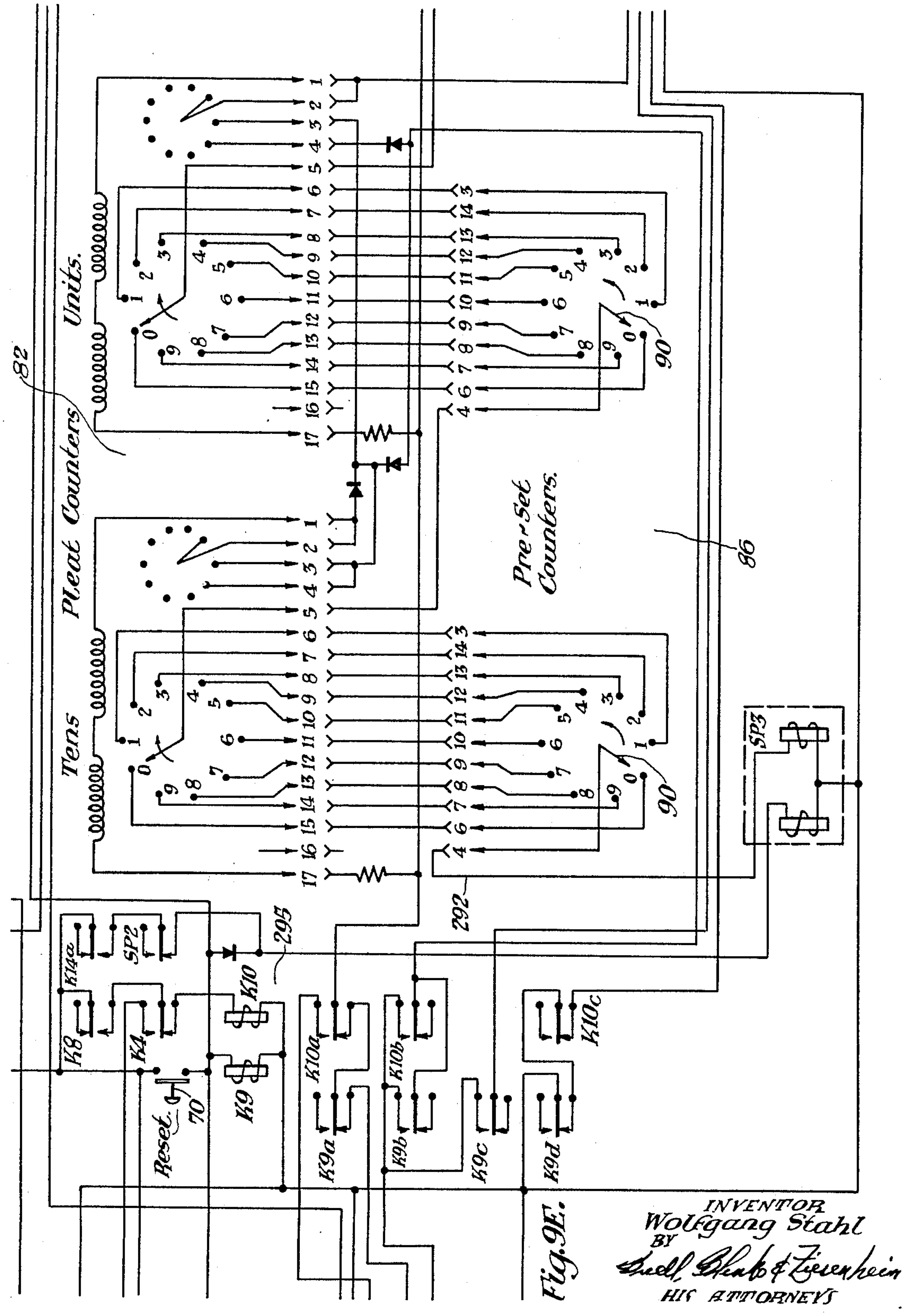
Figure 9F:
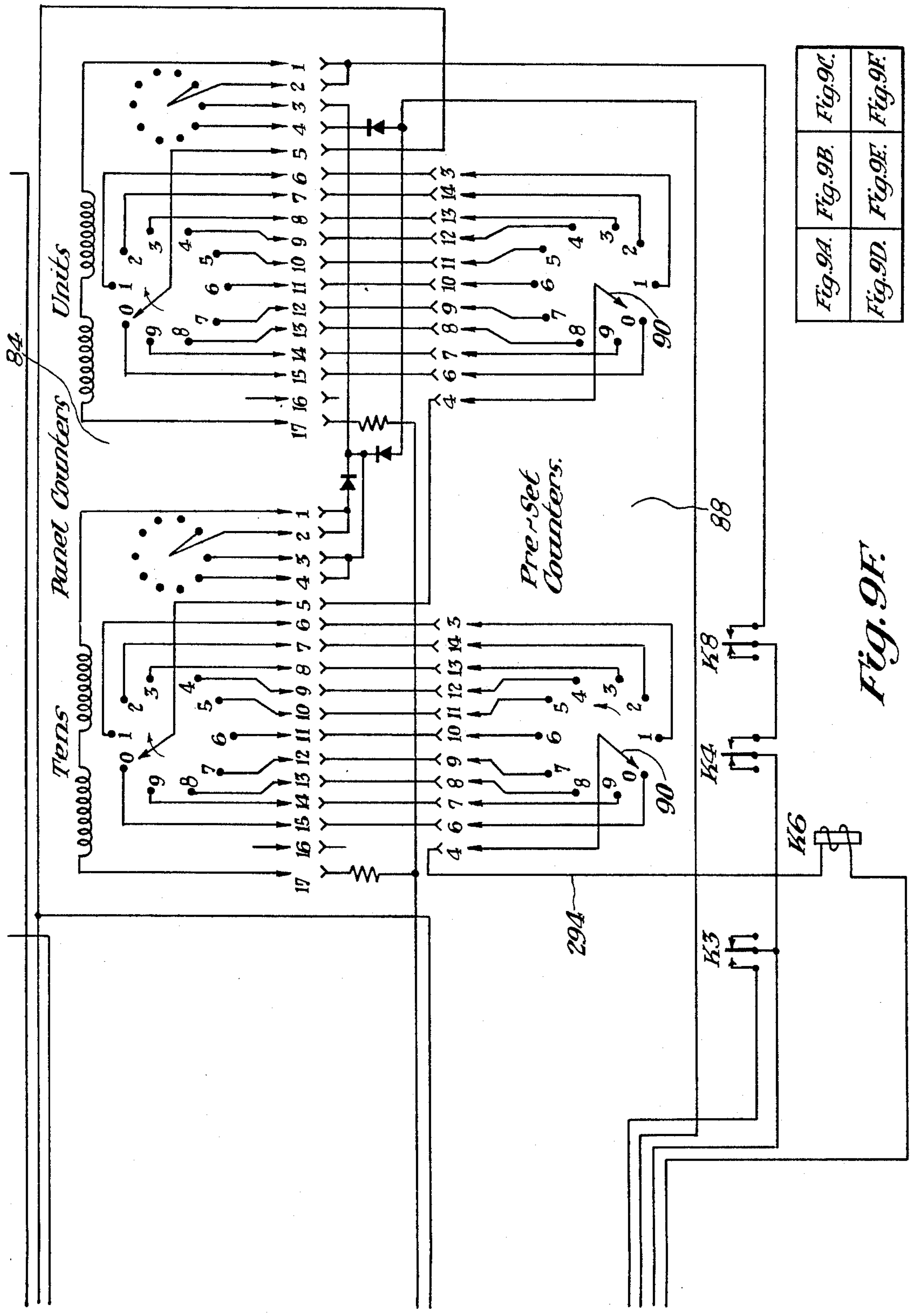

Referring now to FIGURE 8 of the drawings a block operating circuit diagram of one form of my novel pleating machine 20 is shown therein. The circuit components shown in FIGURE 8 are detailed in FIGURE 9 as described more fully hereinafter. Briefly, the power supply 62 shown in FIGURE 8 is coupled through conductor 260 and on-off switch 66 to a source of line voltage. The power supply 62 supplies the necessary voltage for variable pickup lamps 232, stationary pickup lamp 254, and other components of the operating circuit, as denoted in FIGURE 8.

In the operating circuit of FIGURE 8, actuation of the "lift" switch 74 at the beginning of a cycle energizes actuating means 56*a* for lift cylinders 56, 58 (FIGURES 1 and 3) to separate the pinch rollers 42, 44 (FIGURE 1) to permit threading of the buckram strip 32 through pre-pleating machine. When the "start" switch 72 is closed, the punch and pleat means 100 (FIGURES 1 and 2) is actuated by the SCR amplifier circuit 262 to make a crease and punch line 100*a*–100*b* (FIGURES 2A and 2B) to commence the pre-pleating program. However, no signal is supplied to the punch amplifier 262 at this time pending actuating of the start switch 72 after threading is completed.

When the punches 112 of the punch bar 101 (FIGURE 4) penetrate the buckram strip 32 a punch limit circuit 266 is actuated to terminate the punching movement and to return the punch and crease bar 101 to its inactive position. The punch limit circuit 266 in turn actuates the pleat amplifier 268 controlling the action of cylinders 154 and yokes 152 (FIGURES 1 and 2) to operate the pleating means 94, 96. The creasing or perforating engagement thereof with the buckram strip 32 is sensed by a pleat limit circuit 270 to inactivate the pleating means 94, 96 and to index the pleat counter 82 and, when appropriate, the panel counter 84.

The pleat and panel counters 82, 84 control the action of relay switch 272 so that the pleating means 94, 96 are not actuated when the punch and pleat means 100 are energized at the end or beginning of a given panel. The panel counting circuit 84 also energizes the automatic shut-off circuit 274 to terminate the operation of the pleating machine 20 at the end of a given program. The malfunction shut-off circuit 275 including relay coils K2 and K1 is actuated by lack-of-material sensing circuit 276 or by improper hole sensing circuit 278, and in turn controls through switching circuit 280 including relay contacts K2*a*, K2*b*, K2*c*, K1*c*, the operation of drive motor 60, rewind motor 46 and associated circuit components including the energization of the stationary pickup photodiode 252 which in turn energizes movably pickup photodiodes 234. On the other hand the sequential energization of the movable pickup light sources 232 is determined by logic circuit 282, which in turn is controlled by pleat counter 82, and pleat limit circuit 270.

Referring now to FIGURE 9 of the drawings, the exemplary operating circuit of FIGURE 8 is shown in greater detail, which will now be described in connection with a more detailed operational sequence of my pleating machine 20. Assuming that the circuit of FIGURE 9 has just been actuated, to its "reset" condition, as by manipulation of the "reset" switch 70, and that the main switch 66 is closed, energization of the "ready start" lamp 76 indicates that the circuit is ready for the beginning of a new operating cycle. At this time the logic circuit including relay switch contacts SP2 and SP3*a* energizes the light source 232 of movable pickup 212. However, the energization of the photodiodes of the movable pickups 210–214 is controlled by the stationary pickup 252–254 (FIGURE 6B) which in turn is energized whenever the machine is turned on except on actuation of shut-off circuit 276 by lack of buckram material. The photodiodes

234 are turned on by the stationary pickup trigger circuit denoted generally by reference character 284, whenever a series of identification holes 100*b* is detected by the stationary pickup 252–254.

The manually operated "lift" switch 74 is then actuated to energize the K5 relay and to actuate the corresponding K5 contacts. A positive signal then reaches the lift brake amplifier 286 which in turn energizes lift solenoid 56*a* which controls a valve (not shown) in the supply circuit of lift cylinders 56, 58 (FIGURE 3). The upper pinch drive roll 44 also is lifted with this action. The time delay circuit 264 is turned on at this time for subsequent use as explained below.

The triggering circuit 284 including SCR 285 commutated after the next actuation of punch amplifier circuit 262 by energization of punch limit circuit 266 and relay K4, time delay network TD, relay K11 and associated contacts K11*a* to de-energize the movable pickup photodiodes 234. This prevents erroneous energization of the movable pickups 210 and 214 by the series of identification holes 100*b* which may already be within the housing 224 of the pleat locating device 40, located between the movable pickups when the latter are staggered along the length of the housing.

At this time the relay coil K5 is latched by its normally open contacts K5*a* and normally closed contacts K11*a*. It should be noted that the punch amplifier switch 262 is now disconnected from the pulse output of the time delay circuit 264.

The operator of the machine 20 can now thread the buckram strip 32 through the punch and pleating device 38, the pleat locating device 40, drive rollers 42, 44, the related machine components, and place the loose end of the buckram strip 32 onto the rewind spindle 26.

Upon momentary manual actuation of the "start" switch 72 a pulse generated by the time delay circuit 264 reaches the gate of the SCR in the punch amplifier circuit 262 to energize punch solenoids 126' which open the valves (not shown) of punch cylinders 126 (FIGURE 1) to punch the three identification holes 100*b*, plus the scored or perforated line 100*a* (FIGURES 2A and 2B) to denote the beginning of a panel. At this time, as pointed out above, the pleating means 94, 96 are not actuated. As the punch and crease bar 101 (FIGURE 4) reaches its lower limit, light source 288 triggers the LASCR 290 of the punch limit circuit 266 to energize relay coil K4 to close its associated contacts which in turn energize the adjustable time delay network TD. This allows an adjustable dwell time for the punch and crease bar 101 to remain down (in its active position) to assure postive creasing.

At the end of the provided time delay, relay K11 is energized, and its associated contacts K11*a* latch relay coil SP1 by momentary closure of contacts K11*a*. The punch and crease bar 101 is retracted as the time delay network TD and its contacts TD1 and TD2 shifts the triggering signal in the punch amplifying circuit 262 and pleat amplifying circuit 268, when energized, from the amplifier SCR's 291 to the commutating SCR's 293. Then drive and rewind motors 60, 46 are energized by means of relay coil K1 and contacts K1*a* and K1*b* and K1*c* respectively.

As the punch and crease bar 101 reaches its upper limit, light source 295 triggers LACSR 297 to energize because of the continued energization of relay K11 through its electrically latching contacts K11*b* to terminate the signal at the lift amplifier 286 and thereby to release the upper pinch roll 44. However, as the pinch roll 44 approaches the buckram strip, relay K11 is deactivated by lift limit switch 299 which in turn de-energizes relay K14. The buckram strip 32 is now transported and the identification holes 100*b* therein approach the stationary pickup 252–254.

The aforedescribed operation of the control circuit components accomplishes the following actions: Momentary actuation of the "start" switch 72 always results in punching a set of identification holes 100*b* to signify the beginning of a buckram panel strip. The punch and crease bar 101 is always retracted before buckram transport to avoid ripping the buckram strip or damaging identification holes which impair accuracy. The machine 20 may be shut down manually or automatically before a given program is completed but will always start up where it left off to assure a minimum of reject panels. The operation of the punching and pleating device 38 is controlled to a minimum of elapsed time to provide maximum production.

As the identification holes 100*b* pass under the stationary pickup 252–254 of the measuring or locating device 40 the photodiodes 234 of the movable pickups 210–214 are energized by the stationary pickup trigger circuit 284. As the associated one of the identification holes 100*b* reaches the movable pickup 212 its corresponding trigger circuit 290 is energized to again actuate the lift cylinders 56 and 58 to lift pinch roll 44. Driving or transportation of the strip 32 is immediately terminated, and at the same time the magnetic brake 50 is actuated to terminate immediately any pulling action upon the buckram strip by the rewind motor 46. However, the signal supplied to the punch amplifier 262 is delayed for a few milliseconds by the delay network 264 to ensure that driving of the buckram strip 32 has ceased before actuation of the punch and crease bar 101 and the other components as described above.

Theoretically, the punch and crease bar 101 and the punch roll 44 could be actuated simultaneously but manufacturing differences in solenoid actuating or the like coils make simultaneous operation practically impossible. The delay network desirably produces precisely the same delay network after each punch, because the delay in this case is substantially less than the inertial movement of the strip 32 which occurs after transport has ceased. A uniform time delay is essential to maximum accuracy in spacing between successive punches. Use of brakes to stop the strip is inaccurate for most applications because of their fading characteristic. Waiting for the strip to cease its inertial movement of its own accord wastes time and is similarly inaccurate as the inertial distance usually varies.

However, the relay SP1 remains latched so that the punch limit circuit 266 including LASCR 290 and the related AND logic circuit including relay contacts TD2, K4*a*, SP1 and K8*a* can immediately pass a signal to the pleat amplifier circuit 268 to actuate the pleating means 94, 96. This action accomplishes the first pleat folds 94*a*, 96*a* in the buckram strip and determines the length of the right hand panel return as established by adjustment of the movable pickup 212.

As the pleating means 94, 96 actuate the pleat limit circuit 270, relay K3 is energized to index the pleat counter 82 once and to latch relay SP2 which in turn energizes the sensor light source 232*b* of movable pickup 210 through an AND portion of AND-AND-OR logic circuit 282.

Transport of the buckram strip is then restored as explained previously, and the foregoing sequence is repeated until the counted pleats (counter 82) equal the pre-set value established, when the machine 20 is programmed, by use of the pre-set pleat counter 86. The adjustable distance between the pleats is set by the position of the movable pickup 210 which precisely and repeatably establishes the pleat center-to-center distance.

When the values of the pleat counter 82 and pre-set pleat counter 86 are thus equalized, the light source 232 of movable pickup 214 is energized through relay contacts SP3*a* of relay SP3 which in turn is energized by the pleat counter read-out signal on conductor 292. At the same time relay K8 is energized together with relay K10 and their associated contacts similarly labeled to reset latching relay SP2 to its original position, the pleat counters 82 and 86 to zero and decouple the pleat triggering circuit 268. Then, when the movable pickup 214 senses the succeeding juxtaposable one of the identification holes 100*b*, only the punch triggering circuit 262, together with the punch solenoids 126, is actuated to denote the end of the buckram panel strip. The distance from the center crease 100*a* of the last pleat folds 94*a*, 96*a*, 100*a* to the end of the panel is adjustably established by the position of the movable pickup 214 to determine the length of the right-hand panel return.

At this time, when the punch and pleat bar 101 is withdrawn, latching relay SP3 is reset through previously reset relay SP2, relay K14, and their contacts SP2*b* and K14*a*. This restores the original condition of logic circuit 282 to reactivate light source 232 of pickup 212. As a result, the machine 10 is now in a condition to produce a succeeding, identical panel strip. The aforedescribed sequence therefore will be repeated as pre-programmed with the last row of identification holes 100*b* and line of perforations 100*a* of each panel strip denoting the beginning of a new panel strip. Thus, wasted material is eliminated. The panel strips can be quickly separated by parting along the beginning and ending punch and crease lines 100*a*, which are readily located and identified by the absence of pleat creases 94*a*, 96*a* thereat.

When the panel counter 84 reaches the value of the preset counter 88 the machine 20 is shut off by energization of relay coil K6 from the read-out signal of the panel counters 84, 88 on conductor 294. At the same time the "end of program" lamp 78 is energized through relay contacts K6*a*.

If it is necessary to change the programming frequently during a single roll of buckram, as in the fabrication of custom draperies, and to keep all of the pre-pleated buckram strips thus formed on the rewind roll 30 (FIGURE 1) the "continuation" switch 75 can be manually actuated instead of the "start" switch 72 after each actuation of the reset switch 70 and change of program. As evident from FIGURE 9 and the preceding description, this procedure will also employ the terminal crease line 100*a* and identification holes 100*b* of the previous panel strip for the start of a succeeding panel strip with a differing program rather than punching a new crease line and identification holes. This eliminates lost time and wasted material.

On the other hand, if the machine 20 is not reprogrammed at this time, actuation of the "continuation" switch 75 causes the preceding program to be repeated, after actuation of the reset switch 70. This results in energizing relay coil K1, through latching relay SP1, to actuate contacts K1*a*–K1*c* to restore rewind and drive motors 46, 60. The preceding program is then repeated using the aforementioned terminal crease line as a starting point.

In order to change the programming to a different number of pleats and panels, the "reset" switch 70 is actuated to set all of the counters to their "zero" positions through relay coil K10 and its contacts K10*a*–K10*c*. At the same time the logic circuit 282 together with the associated electromechanically latched relays SP1, SP2 and SP*c* is reset through relay K9 and its contacts K9*a*–K9*d*.

As noted previously the malfunction shut-off circuit 275 will be actuated whenever the buckram material on pay-off roll 28 (FIGURE 1) is used up before the pre-set pleat and panel values are attained, or when the punch and crease bar 101 fails to be actuated during a predetermined period of time, for any reason. One arrangement for accomplishing this includes an RC network 296, forming part of the improper hold shut-off circuit 278. Voltage through resistance 298 in this example attempts to charge capacitor 300 through normally closed relay contacts K4*b* and transistor 301 to turn on unijunction transistor 302 within a pre-established time interval, for example three seconds. If a punch occurs within this interval the capacitor 300 will discharge through the then momentarily closed relay contacts K4*b*, owing to the similarly energized relay coil K4 by punch limit circuit 266. However, if no punch occurs within this time, the capacitor 300 instead charges to maximum voltage and unijunction transistor 302 triggers SCR 304 which in turn actuates relay K2 with the result that its associated contacts, as shown in FIGURE 9, completely de-activate the machine 20, with the exception of "malfunction" lamp 80, which is energized by relay contacts K2*a*. The machine 20 must then be switched off, by opening "main" switch 66 as a safety feature, to release the latching action of the SCR 304 and to release relay coil K2. After the malfunction has been rectified and the machine again switched on, it will automatically continue with the previously established program, owing to the "memory" characteristic of the latching relays SP1, SP2, and SP*c*, in the manner described above. Alternatively, if so decided, the "reset" switch 70 can be actuated to enable the machine 20 to be re-programmed.

From the foregoing it will be apparent that novel and efficient forms of automatic pre-pleating or pre-folding apparatus have been disclosed herein.

I claim:

1. A pre-pleating machine comprising means for supporting and transporting a strip of relatively stiff foldable material along a path through said machine, means mounted on said machine along said path for punching and creasing said strip, pleating means mounted adjacent said punching and creasing means for creasing said strip, said pleating means being movable toward and away from said punching and creasing means in the path of travel of said strip to adjust the depth or pleats imparted to said strip.

2. The combination according to claim 1 wherein equal numbers of said pleating means are disposed on each side of said punching and creasing means at respectively equal distances therefrom.

3. The combination according to claim 2 wherein means are provided for laterally adjusting each of said pleating means so that the distances between said punching and creasing means and adjacent ones of said pleating means remain equal irrespective of the adjusted position of said pleating means.

4. The combination according to claim 1 wherein said punching and creasing means and said pleating means each include a creasing bar and a die bar disposed with the path of said strip therebetween, and means for moving selected ones of said scoring bars and said die bars the remainder thereof to crease said strip.

5. The combination according to claim 4 wherein some of said creasing bars and their associated die bars are inverted relative to the remainder of said creasing bars and associated die bars to effect a zig-zag pre-folding of said strip.

6. The combination according to claim 3 wherein said lateral adjustment means includes first rack and pinion means connected to those pleating means adjacent said punching and creasing means, and second rack and pinion means connected to those pleating means next outwardly of said adjacent pleating means, said first and said second rack and pinion means having a gear ratio of 1:2.

7. The combination according to claim 1 wherein electro-mechanical adjustment means are mounted on said machine at a position along said path adjacent said pleating means, said electro-mechanical means including sensor means movable toward and away from said punching and creasing means along said path and co-operable with holes punched in said strip by said punching and creasing means, said electro-mechanical means including an actuating circuit coupled to said sensor means and to actuating means for said punching and creasing means for determining the location of succeeding punches and pleats imparted to said strip by said punching and creasing means.

8. The combination according to claim 7 wherein a plurality of said sensor means are provided and are spaced laterally of said strip for movement longitudinally of said strip, said punch and creasing means having a like number of punches mounted thereon for punching said holes across said strip, said sensor means co-operating respectively with said holes and being mounted for movement respectively along paths parallel to those defined by said holes when said strip is moved.

9. The combination according to claim 8 wherein said pre-pleating machine includes an operating circuit coupled to said punching and creasing means for actuating said punching and creasing means upon closure of a starting switch for said machine, said operating circuit including first actuating means coupled to a first one of said movable sensor means for a succeeding actuation of said punching and creasing means to establish a right return of said strip, said operating circuit including second actuating means coupled to a second one of said movable sensor means for actuating said punching and creasing means a predetermined number of times to determine center-to-center pleat spacing along said strip, said electro-magnetic circuit including third actuating means coupled to a third one of said movable sensor means for actuating said punching and creasing means following the last of said center-to-center punch and crease spacings to determine a left return of said strip, and additional actuating means coupled only to said first and said second actuating means for actuating said pleating means immediately after the actuation of said punching and creasing means.

10. The combination according to claim 9 wherein said machine includes circuit means coupled to said strip transporting means for de-activating said transporting means immediately prior to actuation of said punching and creasing means and for re-activating said transporting means immediately after the initial actuation of said punching and creasing means and after each successive actuation of said pleating means.

11. The combination according to claim 1 wherein said actuating means for said movable pleating means includes a pair of yoke members extending along the path of movement of said pleating means and overlying the ends respectively of said pleating means and means for displacing said yoke members toward said strip material to cause said pleating means to engage said strip material irrespective of the adjusted position of said pleating means.

12. In a pre-pleating apparatus and the like, the combination comprising an elongated housing, means in said housing for defining a strip path therethrough and longitudinally thereof, at least one sensor movably mounted on said housing for movement along said strip path, said sensor having a light source and a juxtaposed photodiode mounted thereon, said light source co-operating with identification holes in said strip to produce out-put control signals in said photodiodes in response to the adjusted position of said sensor.

13. The combination according to claim 12 wherein said light source and said photodiode are mounted adjacent one side of said strip, an elongated mirror is mounted on the other side of said strip and juxtaposed to the path of said light source so that the light thereof can be reflected through a juxtaposed one of said holes to said photodiode.

14. The combination according to claim 13 wherein a light baffle is mounted on said sensor for movement therewith and interposed generally between said light source and said photodiode to multiply the light ratio of light reflected from said strip and from said mirror respectively.

15. The combination according to claim 12 wherein said movement mounting means includes a channel member defining the path of movement of said sensor and being inserted therethrough, said channel member having a plurality of conductive strips positioned for engagement by contact fingers mounted on said sensor for conducting electrical potential to and from said light source and said photodiode.

16. The combination according to claim 14 wherein a partition plate is mounted in said housing between said strip path and said sensor, said partition plate having at least one elongated slot therein extending longitudinally of said housing and juxtaposed and the path of sensor movement to said mirror, said light baffle extending into said slot to further discriminate between light reflected from said strip and from said mirror.

17. The combination according to claim 1 wherein electro-magnetic circuit means are provided for successively actuating said punching and creasing means and said pleating means, said circuit means including a normally open power supply circuit coupled between said actuating means and a source of energized potential therefor and a delay circuit network connected in bypassing relationship to said open circuit for providing a closed by-passing circuit path but only for causing said delay circuit for a predetermined time interval following each actuation of said punching and creasing means so that failure of a succeeding actuation of said punching and creasing means to occur within said interval de-energizes said machine.

18. The combination according to claim 7 wherein said electro-mechanical means includes pre-settable counter means for successively energizing said punching and creasing means and said pleating means and for terminating the action of said punching and creasing means and said pleating means after a predetermined number of pleat folds have been produced in said strip to determine the number of said folds in a given panel strip.

19. The combination according to claim 18 wherein said electro-mechanical means in addition includes presettable panel counting means for repeating the sequential actions of said machine until a given pre-set number of said panel strips are produced by said machine.

20. The combination according to claim 1 wherein actuating means are coupled to said punching and creasing means and to said pleating means for the repetitive actuation thereof, and circuit means including pre-settable pleat cluster counter means are coupled to said actuating means for terminating the action of said actuating means after a given pre-set number of pleat clusters are produced in said strip by said pleating means and said punching and creasing means to determine the number of said clusters in given panel strip.

21. The combination according to claim 18 wherein said operating circuit includes pre-settable panel counting means for repeating the sequential actions of said first and said second and said third actuating means until a given pre-set number of pre-folded panel strips are produced by said machine.

22. The combination according to claim 1 wherein a number of said pleating means are provided, a scale is secured to one of said pleating means for movement therewith, and cooperating scale indicator means are secured to another of said pleating means for movement therewith.

23. The combination according to claim 22 wherein equal numbers of said pleating means are disposed on each side of said punching and creasing means at respectively equal distances therefrom, said scale and said indicator means are secured to the outermost ones respectively of said pleating means relative to said punching and creasing means, said scale being calibrated to indicate the strip distance between said outermost pleating means in terms of total length of material in a corresponding finished pleat cluster.

24. The combination according to claim 20 wherein said actuating means includes means for actuating only said punching and creasing means before the beginning and after the ending of said repetitive actuation to denote the beginning and ending of successive panel strips and the left and right returns thereof.

25. The combination according to claim 24 wherein presettable panel strip countermeans are coupled to said pleat cluster counter means and to said actuating means for terminating the action of said machine after a predetermined number of panel strips have been produced.

References Cited

UNITED STATES PATENTS

| | | | |
|---|---|---|---|
| 2,708,059 | 5/1955 | Petzal et al. | 223—30 |
| 2,830,401 | 4/1958 | Davies et al. | 223—34 |
| 3,190,512 | 6/1965 | Nathanson | 223—30 |
| 3,204,837 | 9/1965 | Baron et al. | 223—34 |
| 3,369,303 | 2/1968 | Henry | 33—174 |
| 3,392,890 | 7/1968 | Cramer | 223—28 |

MERVIN STEIN, Primary Examiner

G. V. LARKIN, Assistant Examiner

U.S. Cl. X.R.

33—174; 156—585; 250—201